United States Patent [19]

Mohammadioun et al.

[11] 4,301,525
[45] Nov. 17, 1981

[54] CENTRAL CONTROL SYSTEM FOR DICTATION

[75] Inventors: Said Mohammadioun; David A. Wittler; Theodore Titus, IV; Luther C. Plunkett, Jr., all of Atlanta, Ga.

[73] Assignee: Lanier Business Products, Inc., Atlanta, Ga.

[21] Appl. No.: 124,213

[22] Filed: Feb. 25, 1980

Related U.S. Application Data

[60] Continuation of Ser. No. 917,745, Jun. 22, 1978, abandoned, which is a division of Ser. No. 782,947, Mar. 30, 1977, abandoned.

[51] Int. Cl.³ .............................................. G11B 27/36
[52] U.S. Cl. ................................... 369/29; 179/6.09; 179/6.17; 364/200
[58] Field of Search ............ 179/100.1 DR, 6 C, 6 R, 179/6 TA, 49, 6.09, 6.17; 360/49, 72.1, 32; 340/286; 455/171, 181, 231; 364/200 MS File; 369/29

[56] References Cited

U.S. PATENT DOCUMENTS

| | | | |
|---|---|---|---|
| 3,372,240 | 3/1968 | Boyers . | |
| 3,527,312 | 8/1970 | Dooley . | |
| 3,641,505 | 2/1972 | Arty | 364/200 |
| 3,648,249 | 3/1972 | Goldsberry | 369/29 |
| 3,678,484 | 7/1972 | Maxwell | 360/8 |
| 3,728,486 | 4/1973 | Kraus | 179/2 R |
| 3,808,372 | 4/1974 | Sielsch . | |
| 3,953,680 | 4/1976 | Zimmermann | 360/8 |
| 3,965,484 | 6/1976 | Matz | 360/61 |
| 3,984,644 | 10/1976 | Matz | 179/2 A |
| 4,115,870 | 9/1978 | Lowell | 364/900 |

FOREIGN PATENT DOCUMENTS 1254295  11/1971  United Kingdom ............... 360/14

*Primary Examiner*—Alan Faber
*Attorney, Agent, or Firm*—Jones, Thomas & Askew

[57] ABSTRACT

A system for providing input electrical signals, for processing the electrical signals to provide digital information, and for recording the processed electrical signals so that they may be retrieved from the system and the information recorded digitally visually presented by the system. The system is particularly well adapted for use with a multiple station dictation system in which the digital information embodied in the processed electrical signals includes the station from which a particular piece of dictation originated and the identification of the person who dictated it, the recorder upon which the dictation was recorded, information relating to the chronological order in which the dictation has been completed, and the length of the dictation. The system further provides means for recording this information on the tape at the end of each piece of dictation and for storing this information in a central storage. The system further provides means for retrieving the stored electrical signals and means for displaying the digital information contained in the electrical signals visually to a supervisor. Additionally, the system provides means for adding further information relating to the importance of transcribing the dictation and the progress which has been made in transcribing the dictation.

2 Claims, 14 Drawing Figures

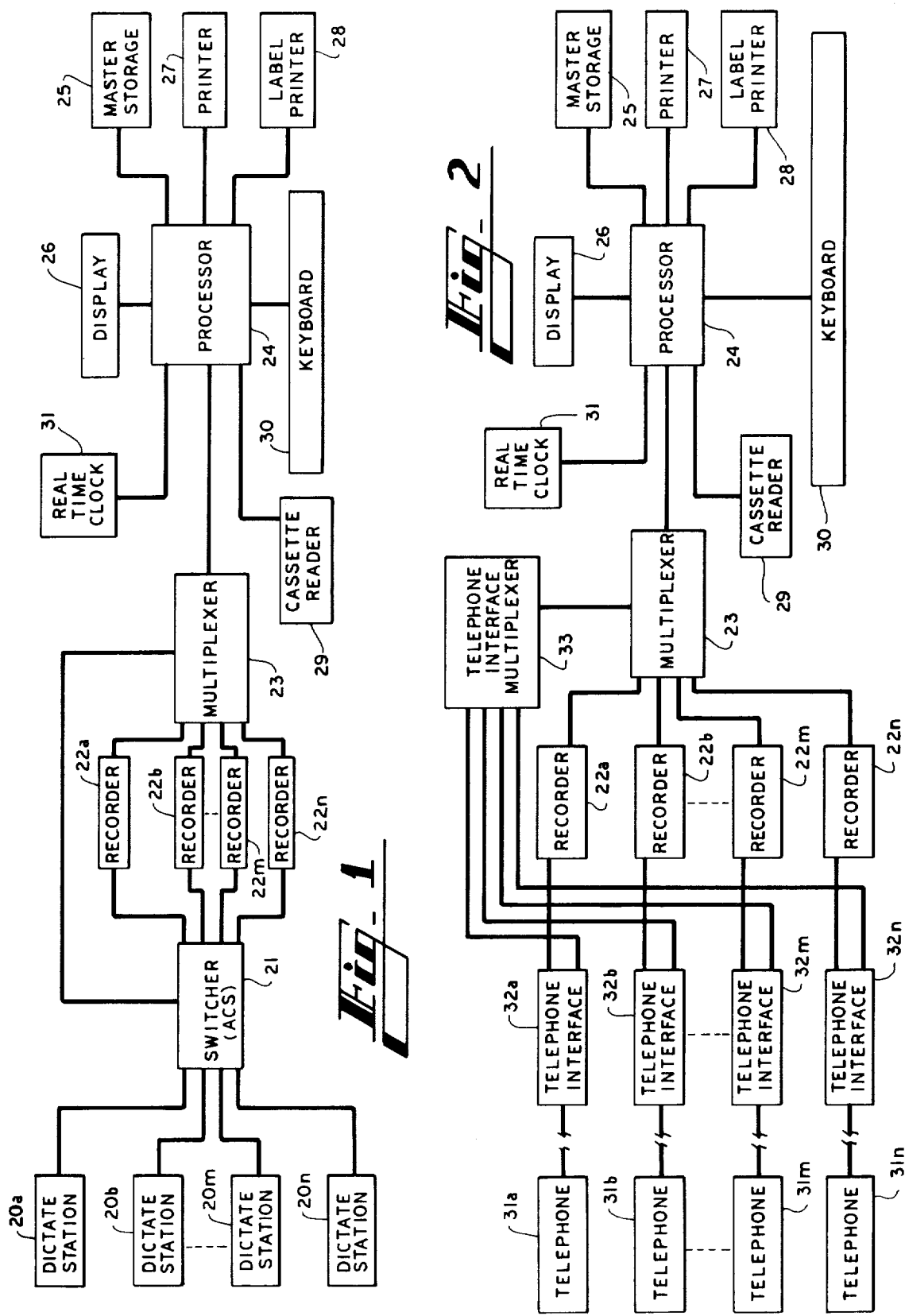

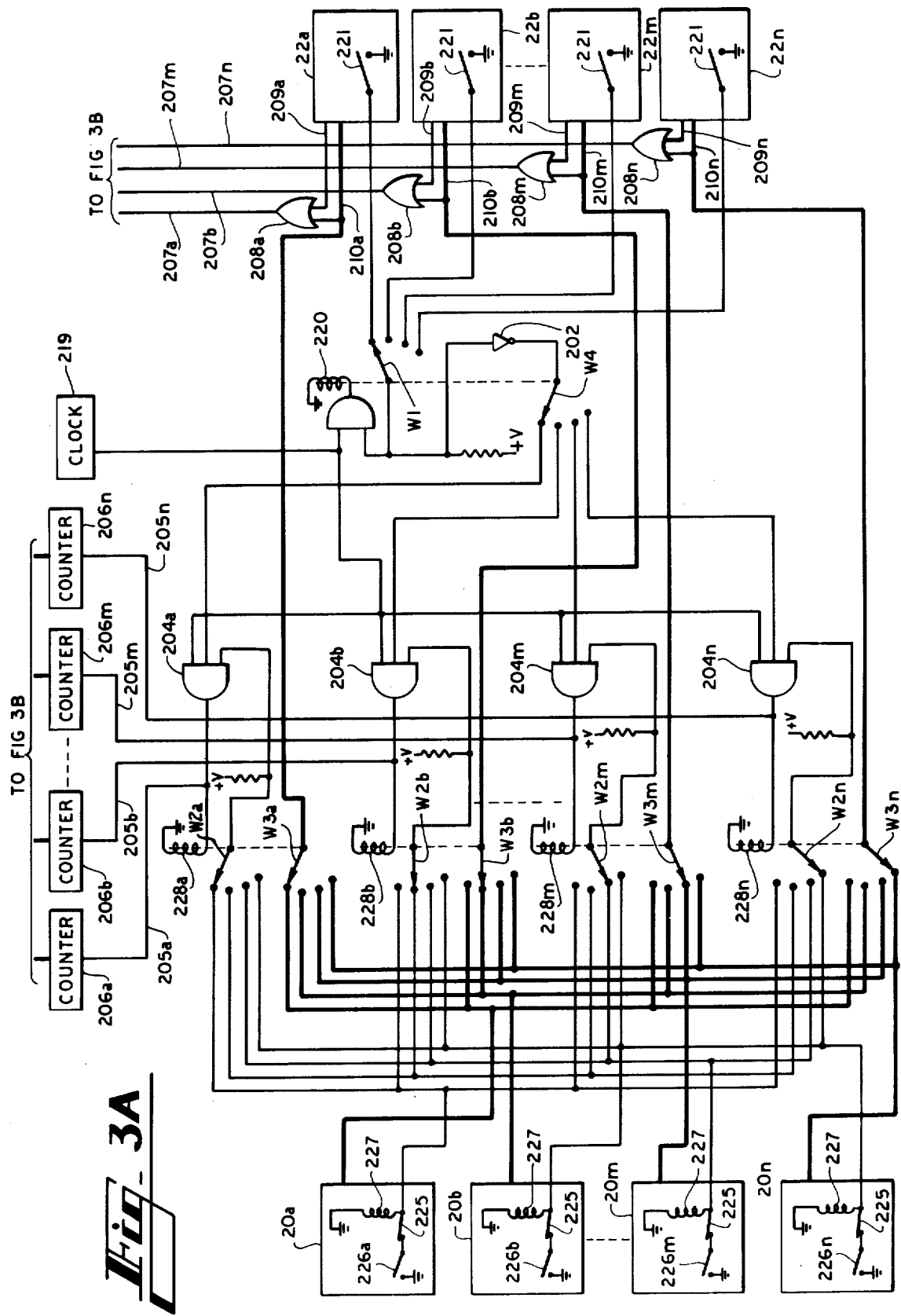

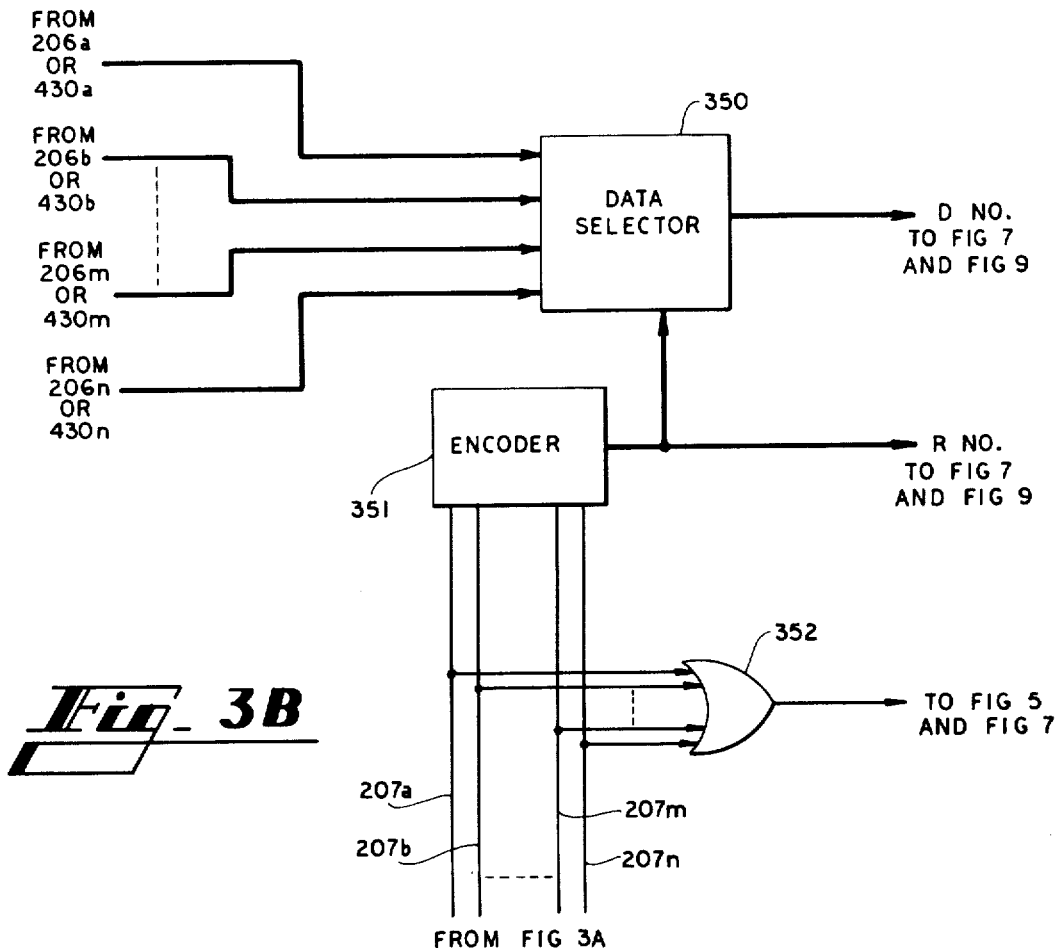
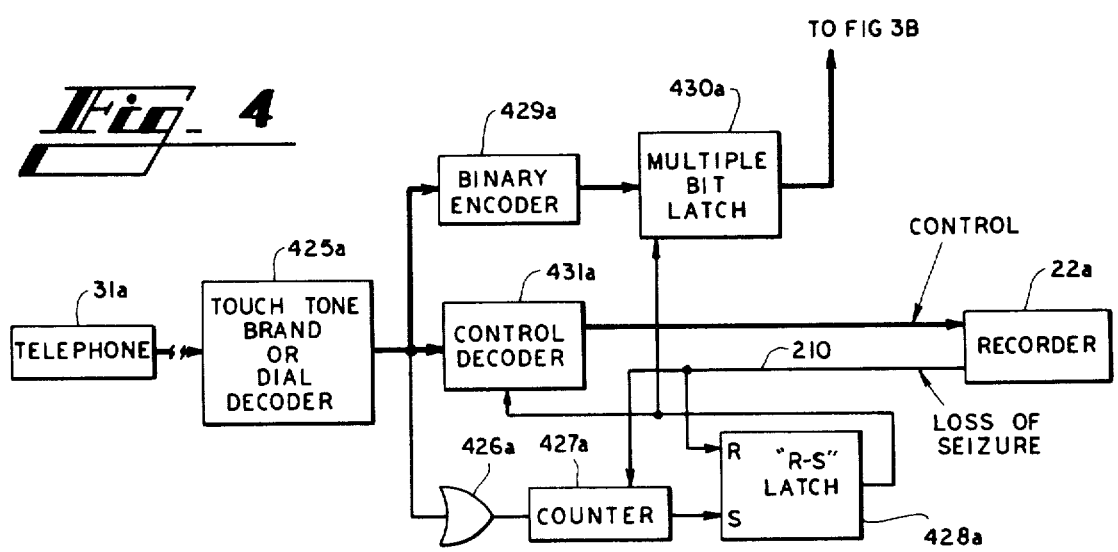

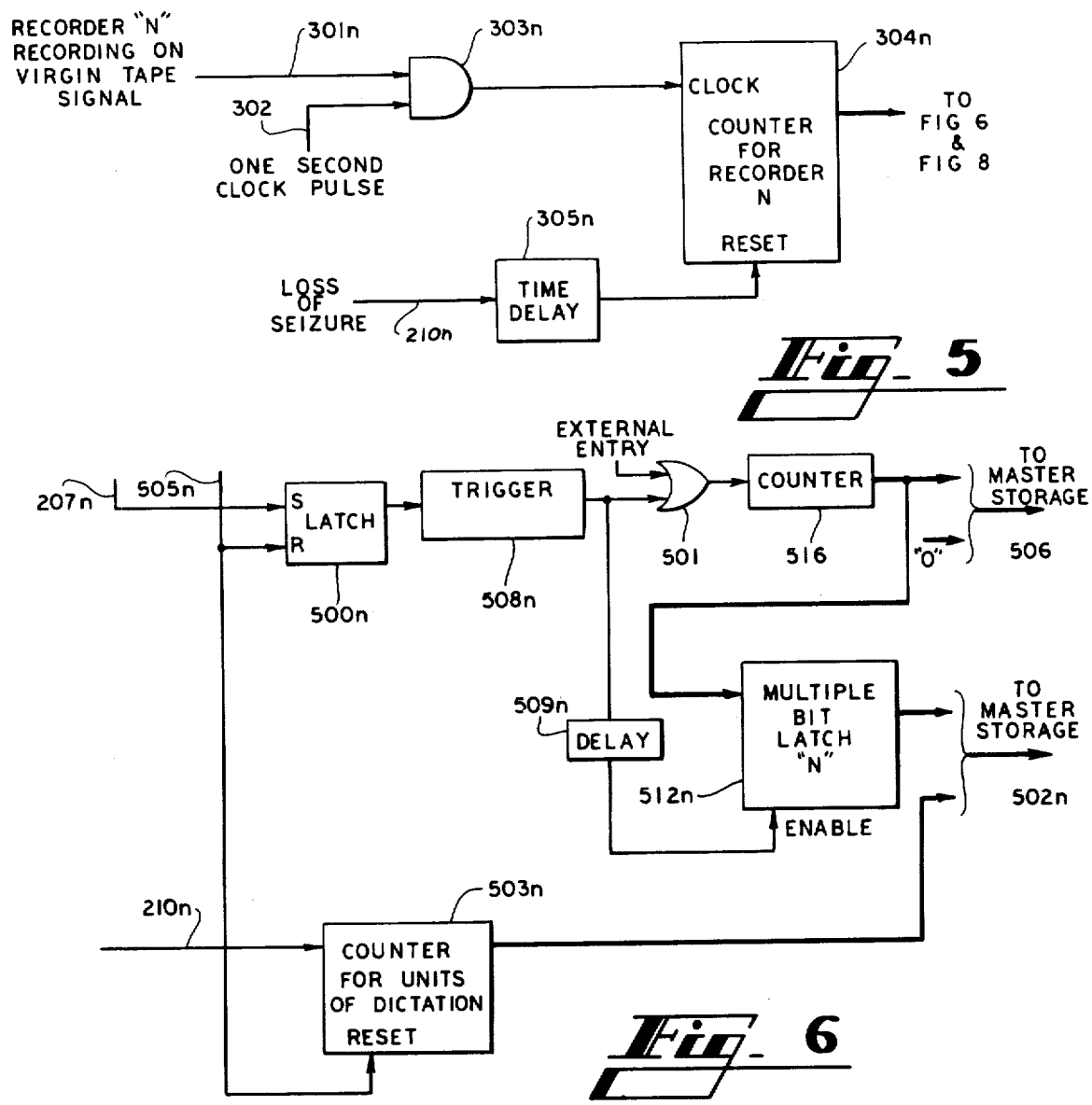
Fig. 5
Fig. 6
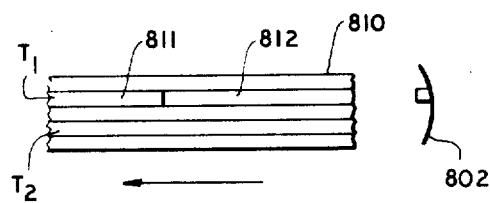
Fig. 8A
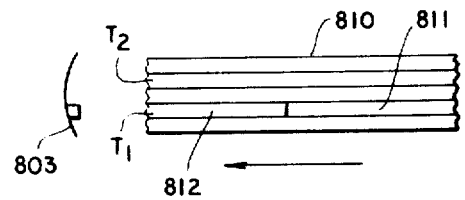
Fig. 8B

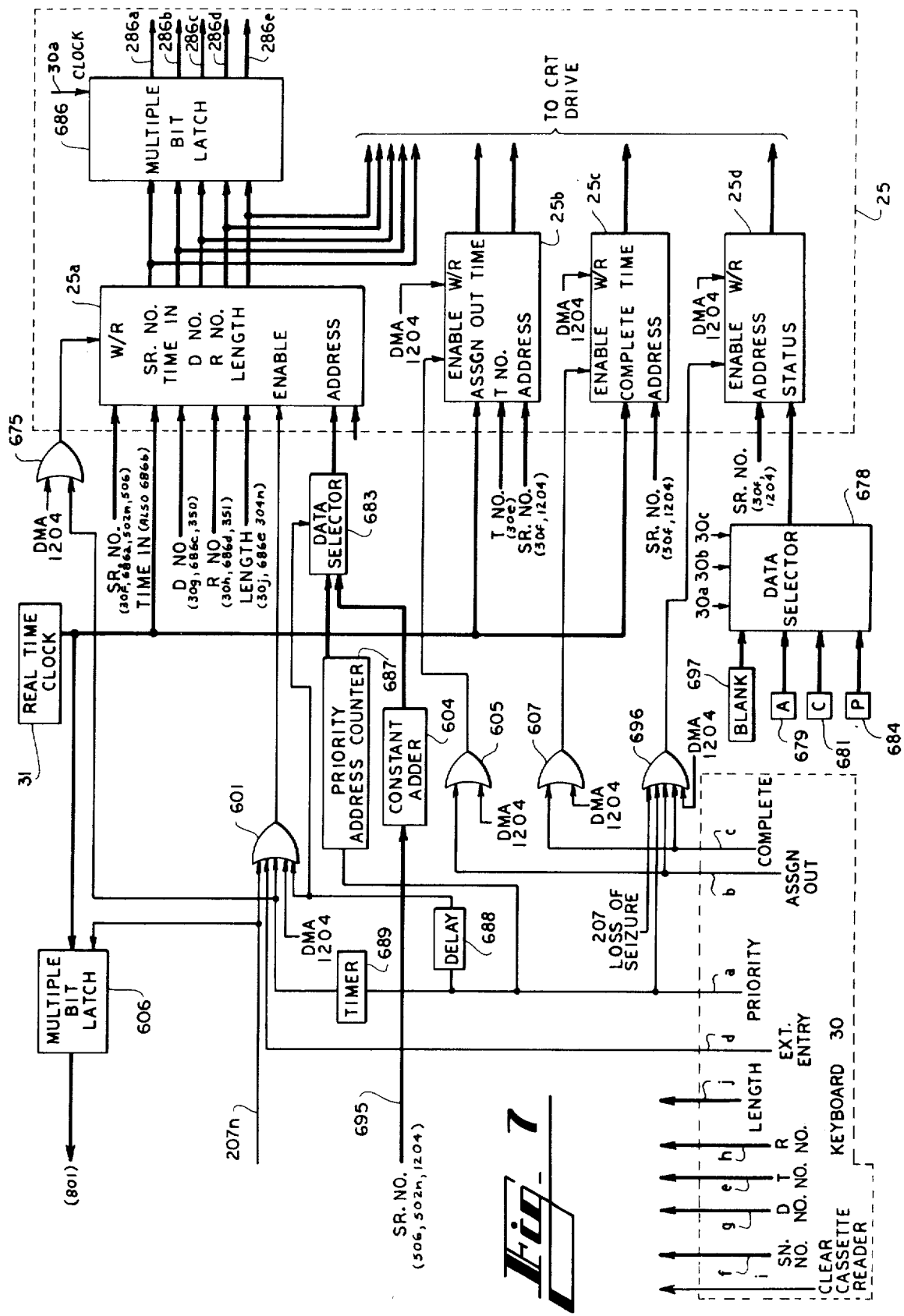

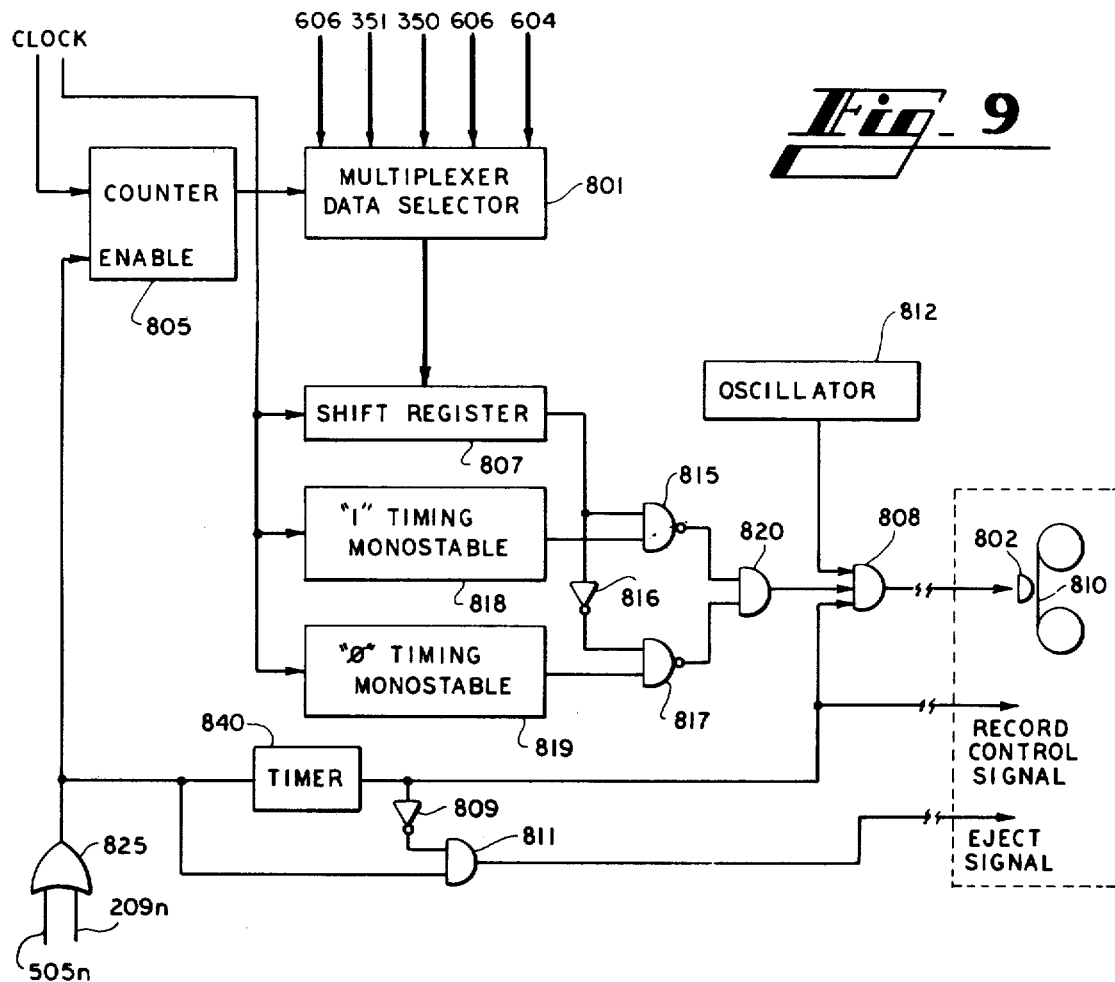
Fig_9
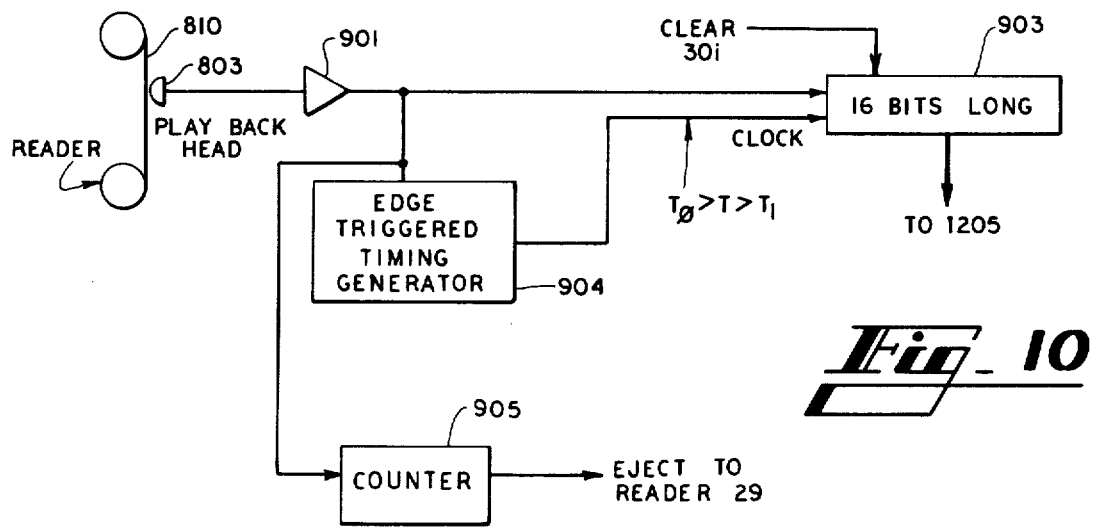
Fig_10

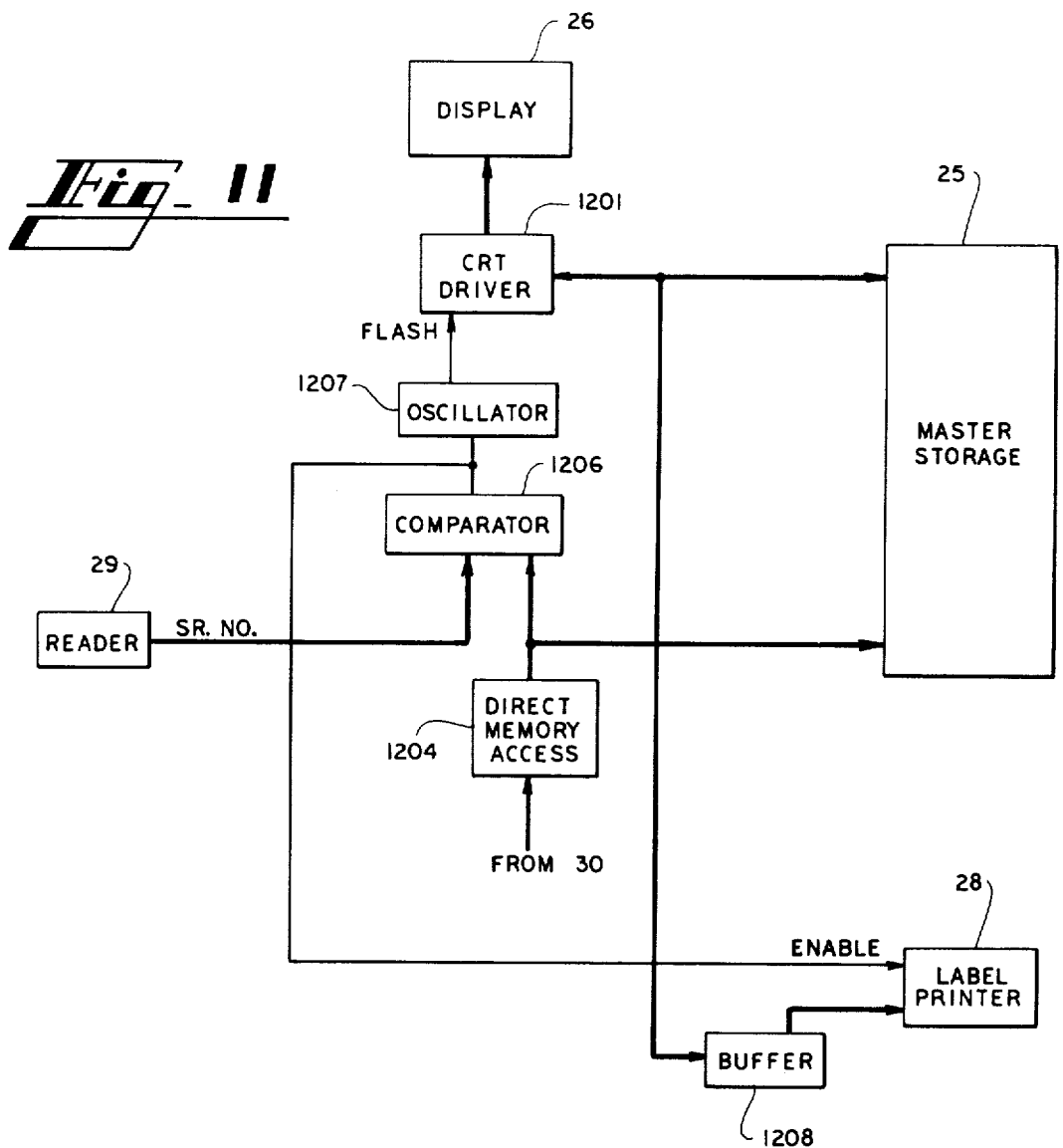
Fig_11

CENTRAL CONTROL SYSTEM FOR DICTATION

CROSS-REFERENCE TO RELATED APPLICATIONS

This application is a continuation of Ser. No. 917,745 filed June 22, 1978, now abandoned, which in turn is a division of Application Ser. No. 782,947 filed Mar. 30, 1977, now abandoned.

BACKGROUND OF THE INVENTION

The present invention relates to the art of generating and processing electrical signals containing digital information, and in particular to the art of generating electrical signals related to the operation of a dictation system and providing processed electrical signals containing digital information concerning the present state of operation of the dictation system and other information required for the management of dictation and transcription generated by a dictation system.

Modern dictation systems have become increasingly complex. Generally, such dictation systems include at least one central recorder. Access to the various central recorders of the dictation system is no longer limited to access by a single dictation station. Additionally, the ability to transcribe dictation from the various central recorders is often shared in modern systems by a number of different transcriptionists. Finally, in some modern systems the dictation is recorded on individual recording members, such as cassettes, so that the dictation may be transcribed from the record members by a number of transcriptionists, each having a playback apparatus, simultaneously and without the need for each transcriptionist to be connected to the central recorder itself. The problems created by the operation of such systems will be hereinafter described more fully.

Modern dictation systems generally include at least one central recorder to which a plurality of remote dictate stations are connected. Dictation systems have evolved away from the systems in which each office had a separate dictation recording machine on which dictation was to be recorded on a wire, a magnetic belt or a tape and then collected to be typed by a secretary having a machine for playing the recorded dictation back for transcription. The advantages of the central recorder include the fact that it is more economical and efficient since it avoids duplication of equipment and it provides a dictation capability to more people.

Many modern dictation systems include more than one central recorder. The use of more than one central recorder enables a greater number of persons to dictate at the same time. However, since there is more than one recorder and each recorder is available to a number of people, the use of a central recorder has the disadvantage of not permitting the identification of the recorded material as that dictated by any specific individual or dictate station. While this problem may not be acute in systems providing manual switching to connect to the dictate stations to the central recorder and in which the number of dictate stations is small, the problem becomes more serious in situations in which the number of dictate stations is great and in which the persons dictating have no control over which central recorder they are connected since the connection is made automatically based on the availability of recorders. For example, in some of the older systems having more than one central recorder, the individual stations were manually switched to connect to a particular recorder. This information, along with the relative order in which the dictation was recorded relative to other pieces of dictation, permitted a person charged with the task of transcribing the material to locate it fairly quickly. However, as the number of dictate stations and central recorders increased, automatic switching to the first available recorder became a part of many dictation systems. Thus, in many modern systems the location of a particular piece of dictation which has been dictated routinely was not possible unless it had been assigned a priority when recorded in those systems having a separate recorder for priority dictation. An example of such a system is disclosed in copending applications Ser. No. 554,476, filed Mar. 3, 1975; now issued as U.S. Pat. No. 4,024,354 and 753,359, now issued as U.S. Pat. No. 4,075,436, 753,360, now issued as U.S. Pat. No. 4,138,695 and 753,361, now abandoned, all filed Dec. 22, 1976 and all assigned to Lanier Electronic Laboratory, Inc.

Another important feature of modern dictation systems which has been described above is the ability of the system to connect a number of different dictate stations, or indeed even ordinary public telephones, to the central recorders of the dictation system. Thus, several dictation stations and all telephones will have access to each of the central recorders of the dictation system. This feature of modern dictation systems may be used in dictation systems having either the older bin-type recorders or the newer cassette dictation recorders which will be described below. Because of the possibility that a number of different individuals using a number of different dictate stations and public telephones might have had access to a particular recorder, it is not possible to identify the dictation of a particular individual by reference to the recorder on which the dictation has been recorded. Additionally, in most modern systems, not only will a large number of individuals have access to a particular recorder but each individual will have access to a number of different recorders and will be assigned a particular recorder based upon the availability of recorders in the system. These features, while making dictation more efficient for the person dictating and also permitting more efficient use of the recorders, precludes identification of the person who has dictated a particular piece of dictation on a particular recorder, or in the case of the cassette recorders to be described below, on a particular recorder and a particular cassette. This inability to identify a piece of dictation by reference to the person who has dictated it precludes assigning that dictation priority over other less important pieces of dictation. This inability to assign priority to a particular piece of dictation is a further example of the sacrifice in control and management of the transcription operation which have been made in order to make more efficient use of the recorders and to make the dictation system more accessible to the individuals dictating.

Another principal cause of management problems in the modern systems described above is the introduction of a plurality of record members, such as cassettes, which may each be used to record one or more pieces of dictation on a particular recorder. Such dictation systems include the system disclosed in U.S. Patent Application Ser. Nos. 554,476, filed Mar. 3, 1975., now issued as U.S. Pat. No. 4,024,354, 753,359, now issued as U.S. Pat. No. 4,075,436, 753,360, now issued as U.S. Pat. No. 4,138,695 and 753,361, now abandoned, all filed Dec. 22, 1976 and all assigned to Lanier Electronic Laboratory, Inc. The advantage in having more than one recorder member on each central recorder is derived primarily from the fact that the advantages in efficient utilization of dictation recording equipment are retained, but without sacrificing the ability to transcribe the dictation in an order other than the order in which they were recorded. Additionally, several pieces of dictation may be transcribed simultaneously by several different transcriptionists, each having a dictation playback machine. Thus, for example, an important piece of dictation may be designed as a priority piece of dictation even though recorded by the same recorder that is ordinarily and routinely used for all dictation, and still be transcribed before less important pieces of dictation, thus eliminating the necessity of a separate priority recorder.

It has also become known in the art to use small hand-held dictation recorders which will record dictation on individual recording members, such as cassettes. The small hand-held dictation recorders allow the person dictating a greater degree of mobility and permit that person to use otherwise idle time more efficiently. The recording members upon which dictation is recorded by the small hand-held dictation recorders may be generally transcribed by a transcriptionist having a transcription playback machine compatible with the above-described cassette recording system. Additionally, if the recording members used in the hand-held dictation machine are smaller than ordinary cassettes, adapters are available for adapting the ordinary dictation playback machine to play back dictation recorded on a the smaller recording member.

While there are substantial advantages to be derived from the use of separate recording members, such as cassettes, to record dictation, the use of individual recording members also creates additional identification and management problems. In the modern dictation systems having one or more cassette dictation recorders, each recording on a plurality of recording members with automatic switching as described above, the location and identification of particular pieces of dictation as being the dictation recorded on a particular recorder and a particular recording member is a problem. The problem is further compounded by the fact that the recording members are transcribed remotely from the central recorder by a number of transcriptionists each responsible for transcribing dictation recorded on a number of different machines or a number of transcriptionists responsible for transcribing the dictation recorded on a particular machine. Moreover, the recording members are generally small in size and may be easily misplaced. Finally, the individual recording members are all similar in appearance and the dictation cannot be identified in any way other than by listening to the various cassettes. Another disadvantage of the cassette dictation recorders is in precisely determining the amount of dictation remaining to be transcribed. In the older bin-type systems the amount of dictation yet to be transcribed could be ascertained by measuring the amount of recorded tape in the bin which had not yet been transcribed. In the modern systems, the amount of dictation remaining to be transcribed may be distributed on a large number of different cassettes, each containing a different amount of recorded tape. While a rough estimate might be based on the number of cassettes outstanding, a precise determination cannot be so approximated. Thus, the straightforward methods of ascertaining the amount of recorded yet untranscribed tape used in the older systems are not applicable to the newer systems.

As has been described above, the control and management of the transcription operation in the dictation system is made more difficult by the existence of a number of different cassettes, each containing a different amount of recorded material, upon which the dictation is recorded. A further feature of cassette dictation recording which has been described above is that each transcriptionist is provided a separate cassette playback machine from which to play back the recorded dictation for transcription. Thus, the use of cassettes to record dictation enables a number of different transcriptionists to simultaneously transcribe material which has been recorded on a single recorder. In fact, the number of transcriptionists transcribing the dictated material is unlimited in such a system. Thus, it will be appreciated that as the number of transcriptionists increases the control and management problems associated with a transcription operation will also increase.

In summary, while the advances in the art have greatly increased the efficiency of modern dictation systems, they have sacrificed the simplicity which made dictation identifiable and the transcription operation manageable. Thus, it is no longer possible to identify a particular piece of dictation by reference to the recorder or the cassette upon which the dictation has been recorded. This inability to identify dictation precludes the assignment of priority to important pieces of dictation. Furthermore, it is no longer possible to ascertain the amount of recorded yet untranscribed dictation remaining within the system or the progress which has been made in transcribing the dictated material simply by reference to the levels of recorded tape in the system. Finally, the fact that the dictation is recorded on a number of different cassettes means that the dictation may be lost or misplaced and also that it will be more difficult to identify and monitor the progress of the particular transcriptionist who has been assigned the task of transcribing the dictation.

SUMMARY OF THE INVENTION

In solving the problems described above, it was found that the present invention was of greater general application than simply providing an apparatus for solving the problems related to dictation systems. Thus, it is the primary object of the present invention to provide an apparatus for providing digital electrical signals corresponding to project identification information and for processing the digital electrical signals and storing the processed digital electrical signals to provide an output which will provide information needed to continually track the progress being made toward completion of the projects. In this manner, the present invention aids the control and management of large operations involving the simultaneous input of diverse projects and the simultaneous performance of the tasks relating to the projects and the completion of the projects.

In those embodiments limited to the solution of the problems described in the Background of the Invention, the first object of the present invention is to provide an apparatus for identifying the individual who has dictated a particular piece of dictation, the recorder upon which the dictation has been recorded, the cassette upon which the dictation has been recorded, the time and sequence in which the dictation has been recorded and the length of the dictation which has been recorded. As will be more fully described below, the alternative embodiments of the present invention directed to dictation systems receive digital electrical signals embodying the aforesaid information relating to the identification of the individual who has done the dictation, the recorder and the cassette upon which the dictation has been recorded, and the lengths of the recording on fresh recording tape which provide the total length of a particular piece of dictation. These digital electrical signals are processed within the apparatus in order to sequentially arrange the digital electrical signals in the order in which the dictation has been recorded and to add the time at which the dictation was recorded. The input electrical signals and the processed electrical signals are then stored by the apparatus and made available for further rearrangement and supplementation as the particular piece of dictation is assigned a priority and assigned to a particular transcriptionist. The electrical signals are then further processed by the apparatus to supplement the information by adding the designation of the transcriptionist who has been assigned the transcription of the dictation and the time at which the dictation has been assigned to the transcriptionist. Finally, the apparatus provides for the further supplementation of the information when the transcription of the dictation has been completed. This further supplementation is accomplished by the further processing of the digital electrical signals by the apparatus to add the information that the transcription of the dictation has been completed and the time at which the transcription has been completed. All of these digital electrical signals are stored and the digital information is available for visual presentation by either a video display to a supervisor or for print out by a printer.

A further object of the present invention is to provide an apparatus whereby electrical signals corresponding to the identification of the person who has dictated a particular piece of dictation, the sequential serial number assigned by the means for processing the input electrical signals to the particular piece of dictation, the recorder and cassette upon which the dictation has been recorded, and the total length of the dictation may all be recorded on the recording medium, such as tape, on which the dictation has been recorded along with and usually at the end of the piece of dictation. As will be more fully described below, the recording of this information along with the dictation enables the identification of each cassette merely by playing back or reading a portion of the cassette. Thus, the identification of the dictation recorded on the otherwise unmarked cassettes is made possible by merely playing back or reading a portion of the recorded tape at the end of the recorded dictation.

In summary, it will be seen that the present invention provides an apparatus for tracking the progress of a piece of dictation through the dictation system by reference to the person who has done the dictation, the sequence in which the dictation was recorded relative to other dictation, the recorder and cassette upon which the dictation has been recorded, the total length of the dictation, the person to whom the dictation has been assigned for transcription, the time assigned for transcription, and the time the transcription has been completed. Moreover, the present invention also provides an apparatus for identifying the particular cassettes by reference to the person who has recorded the dictation on the cassette, the sequence in which the dictation was recorded relative to other dictation, the recorder and the cassette upon which the dictation was recorded, and the total length of the dictation. The identification of the cassettes along with the ability to track the progress of dictation through the dictation system also permits the assignment of priority to important pieces of dictation. These and other objects and advantages will be more apparent by reference to the following description of a preferred embodiment of the present invention and by reference to the attached drawings.

DESCRIPTION OF THE DRAWINGS

FIG. 1 is a block diagram of a preferred embodiment of the apparatus of the present invention directed toward use in a dictation system including a plurality of dictate stations and a plurality of recorders, the lines between the elements the apparatus denote paths over which digital electrical signals flow containing digital control signals and information;

FIG. 2 is a block diagram of a preferred embodiment of the apparatus of the present invention directed toward use in a dictation system including a plurality of recorders and a plurality of telephone interface units, the lines between the elements of the apparatus designate paths over which digital electrical signals flow carrying digital control signals and information;

FIG. 3A is a preferred embodiment of a first section of the switcher 21 of the disclosed embodiment of the present invention shown in FIG. 1;

FIG. 3B is a preferred embodiment of the portion of the preferred embodiments shown in both FIGS. 1 and 2 which provides the digital control signals and information to the multiplexer 23. In the preferred embodiment shown in FIG. 1, the circuit shown in FIG. 3B forms a part of the switcher 21. In the preferred embodiment shown in FIG. 2, the circuit shown in FIG. 3B is a part of in the telephone interface multiplexer 33.

FIG. 4 is a preferred embodiment of the telephone interface multiplexer shown in FIG. 2 in which digital electrical signals are provided containing the identification number of the individual connected by the telephone interface multiplexer to each particular recorder;

FIG. 5 is a preferred embodiment of that portion of the preferred embodiment of the recorders 22a, 22b, . . . 22m, 22n in which digital electrical signals are provided and stored corresponding to the total length of dictation recorded on a particular recorder;

FIG. 6 is a diagram of a preferred embodiment of the parts of the recorders 22a, 22b, . . . 22m, 22n and the processor 24 wherein digital serial numbers are assigned to each cassette on which dictation has been recorded;

FIG. 7 is a diagram of a first preferred embodiment of the master storage 25 and the portion of a first alternative embodiment of the processor 24 that provides digital control signals and information to the master storage 25.

FIG. 8A is a pictorial representation of the apparatus in the recorders 22a, 22b, . . . 22m, 22n for recording digital information identifying a cassette on the tape following the end of dictation before the cassette is ejected from the recorder 22a, 22b, . . . 22m, 22n;

FIG. 8B is a pictorial representation of the apparatus in the cassette reader 29 for playing back the cassette identification information from the tape in the cassette without the need to rewind the tape in the cassette;

FIG. 9 is a diagram of that portion of the first alternative embodiment of the processor 24 in which digital signals corresponding to the total length of dictation, the recorder number, the dictator number, the time the dictation was recorded, and the serial number of the dictation are generated and transferred to the individual recorder upon which the dictation has been dictated;

FIG. 10 is a diagram of the cassette reader 29;

FIG. 11 is a diagram of a preferred embodiment of the display circuit;

DETAILED DESCRIPTION OF ILLUSTRATIVE EMBODIMENTS

Figure 12:
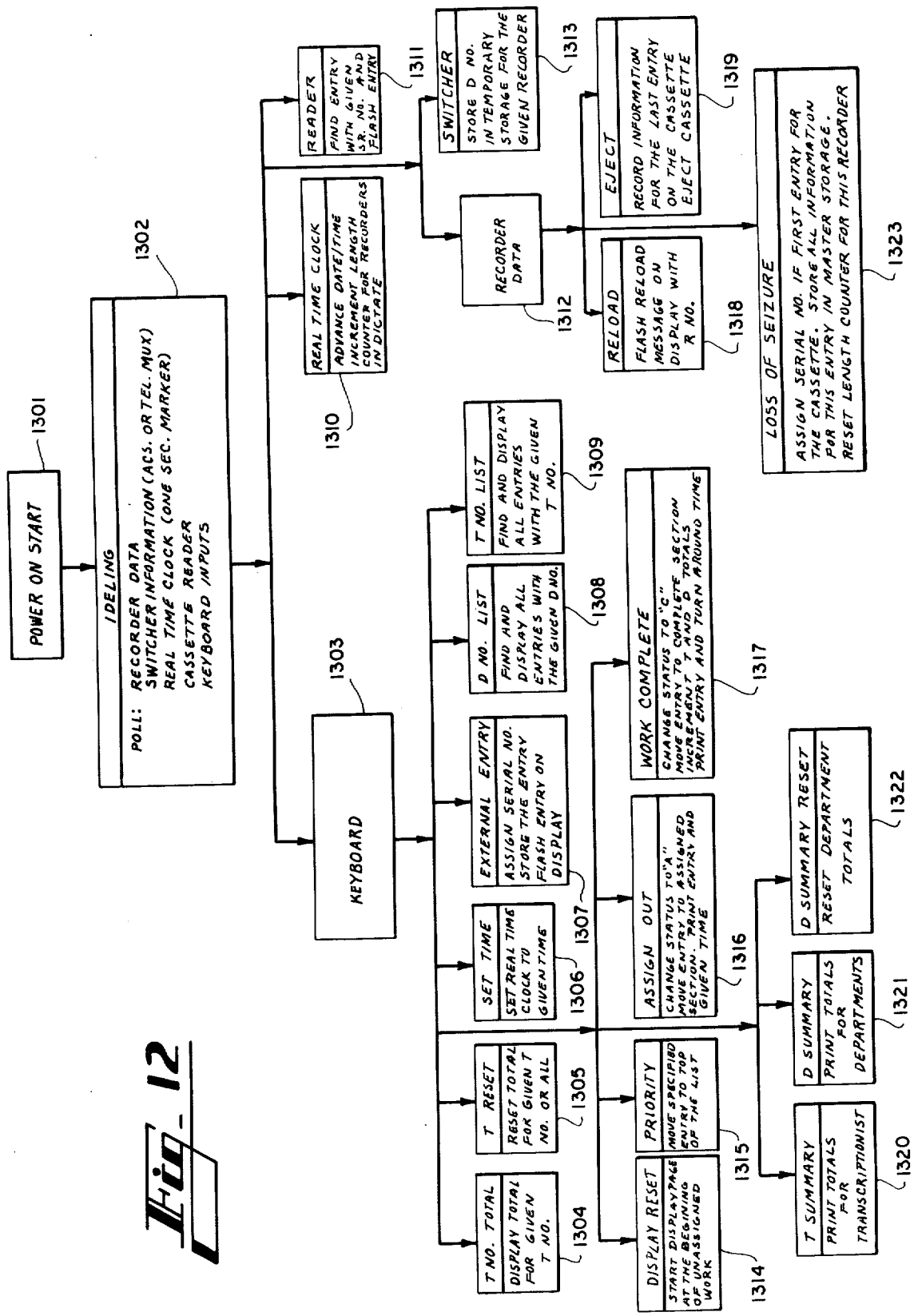
FIG. 12 is a functional flow diagram for a second alternative embodiment of the processor 24.

As had been described above, the present invention provides advantages not limited to dictation systems. The invention is an apparatus whereby information relating to a number of diverse projects may be entered as digital electrical signals, and the digital electrical signals arranged, revised, and supplemented according to the identification of the projects, their relative priority, their respective stages of completion and the persons to whom they have been assigned for completion. Thus, the present invention provides an apparatus for automatically organizing, tracking and managing information related to a number of diverse projects being performed simultaneously.

The alternative illustrative embodiments of the present invention to be disclosed herein are directed toward use of the invention in a dictation system. However, those skilled in the art will recognize that the embodiments disclosed may be applied in a variety of different environments, not limited to the environment of a dictation system. Referring now to FIG. 1, a preferred embodiment is shown in a block diagram which identifies the paths over which digital signals containing digital information pass between the various elements of the dictation system in which the preferred embodiment is disclosed. The preferred embodiment is shown in connection with an ordinary dictation system including a plurality of dictate stations 20a, 20b, . . . 20m, 20n, connected through an automatic channel selector (ACS) switching device 21 to a plurality of central recorders 22a, 22b, . . . 22m, 22n. The dictation system described above is connected to the processor 24 of the preferred embodiment through a multiplexer 23. It must be emphasized that the lines drawn on FIG. 1 represent paths over which digital signals containing information flow. Therefore, even though dictate stations and recorders have been connected through switches in the prior art to form a dictation system, it will be understood by those skilled in the art from the further description of the preferred embodiment that new and useful digital signals are provided and flow over these information paths.

With further reference to FIG. 1, it is shown that the processor 24 is connected to a master storage 25 for the digital signals. Additionally, the processor may be connected to a video display 26, a printer 27, a label printer 28 and a cassette reader 29. Further, digital signals may be generated and entered into the processor through a keyboard including a plurality of special function keys including, but not limited to, a priority key 30a, an assign-out key 30b, a work completed key 30c, an external entry key 30d, and a transcriber number key 30e.

As is shown in FIG. 2, the preferred embodiment of the present invention may also be used in conjunction with a dictation system connecting a plurality of central recorders 22a, 22b, . . . 22m, 22n, to a plurality of ordinary telephones 31a, 31b, . . . 31m, 31n through a plurality of telephone interface devices 32a, 32b, . . . 32m, 32n and a telephone interface multiplexer 33. While such dictation systems are known in the art, it must again be emphasized that the lines drawn on FIG. 2 are lines over which digital information flows and that the dictation system shown in FIG. 2 and used in conjunction with the preferred embodiment of the present invention generates new and useful digital signals which flow over the information paths shown in FIG. 2.

IDENTIFICATION OF SOURCE OF DICTATION AND RECORDER BY WHICH DICTATION WAS RECORDED

A preferred embodiment of the apparatus whereby digital signals are generated identifying the dictate station to which a particular recorder on which dictation is being recorded is connected as shown in FIG. 3. It will be understood by those skilled in the art that the embodiment of the automatic channel selector (ACS) 21 disclosed in FIG. 3 is representative of automatic channel selectors and that a variety of different automatic channel selectors may be modified in accordance with the teachings of the present invention and connected in a circuit as shown in FIG. 3 to provide the desired information identifying the dictate station connected to a particular recorder. It will be understood by those skilled in the art that the ACS 21 provides an apparatus for operatively connecting a plurality of dictate stations 20a, 20b, . . . 20m, 20n to a plurality of recorders 22a, 22b, . . . 22m, 22n. The ACS 21 provides this operative connection through a plurality of switches W3a, W3b, . . . W3m, W3n. As will be more fully described below, the switches W3a, W3b, . . . W3m, W3n are operatively associated with only one recorder per switch. Thus, the switch W3a is operatively associated with the recorder 22a, the switch W3b is operatively associated with the recorder 22b, the switch W3m is operatively associated with the recorder 22m, and the switch W3n is operatively associated with the recorder 22n. Each of the switches W3a, W3b, . . . W3m, W3n has the capability for operatively connecting the recorder with which it is associated with each of the dictate stations 20a, 20b, . . . 20m, 20n in the dictation system. The function of the ACS 21 is to operatively connect a dictate station 20a, 20b, . . . 20m, 20n which has been placed in the off-hook condition to an available recorder for the recording of dictation. Additionally, in the preferred embodiment of the present invention the ACS 21 also provides digital information identifying the dictate station and recorder upon which a particular piece of dictation is being recorded. Both of these functions will be hereinafter described.

The ACS 21 also includes a stepper switch W1 and a set of stepper switches W2a, W2b, . . . W2m, W2n. The stepper switches W2a, W2b, . . . W2m, and W2n may be different levels of the stepper switches W3a, W3b, . . . W3m, and W3n since the switches W2a and W3a operate simultaneously, the switches W2b and W3b operate simultaneously, the switches W2m and W3m operate simultaneously and the switches W2n and W3n operate simultaneously. Additionally, each of the switches W2a, W2b, . . . W2m, and W2n is operatively associated with only one of the recorders 22a, 22b, . . . 22m, 22n and provides a means for connection between the recorder with which it is associated and all of the dictate stations 20a, 20b, . . . 20m, and 20n.

The function of stepper switch W1 is to poll the plurality of recorders 22a, 22b, . . . 22m, 22n in order to find a recorder which is available for recording dictation. Similarly, the function of each of the stepper switches W2a, W2b, ... W2m, and W2n is to poll the dictate stations 20a, 20b, ... 20m, 20n in order to find a dictate station which isoff-hook and on which an individual desires to dictate. As will be described more fully below, the simultaneous operation of the stepper switches W1 and the appropriate stepper switch W2a, W2b, ... W2m, or W2n combine to connect a dictate station on which an individual desires to record dictation with a recorder which is available for recording dictation.

As can be seen from FIG. 3A, the switch W1 is operatively connected to an stepper 220 which acts in response to a clock 219 to cause the stepper switch W1 to poll the various recorders for an available recorder. The stepper 220 will poll the recorders as long as a logical one output is provided by AND gate 201. The inputs to AND gate 201 are a clock input and the input from the stepper switch W1. As shown representatively by the detailed drawing of recorder 22a in FIG. 3A, each recorder 22a, 22b, ... 22m, 22n is connected to the stepper switch W1 through a switch 221 which is a part of each of the recorders 22a, 22b, ... 22m, 22n. When the recorder is not in use and is available for recording dictation the switch 221 will be closed and grounded. Thus, when the stepper switch W1 connects with an available recorder, as evidenced by the closure of switch 221 and the grounding of the connection between the stepper switch W1 and the recorder, a ground or zero logical condition will be placed on one of the inputs to the AND gate 201 thereby eliminating the output from the AND gate 201 to the stepper 220 and stopping the operation of the stepper switch W1 at the available recorder. It will now be understood that the stepper switch W1 operates continuously to poll the various recorders until an available recorder is found. When an available recorder is found the operation of the stepper switch W1 is stopped and the available recorder found will be the recorder connected through the appropriate W2 switch to the next dictate station providing an off-hook condition indicating that an individual wishes to dictate. As will be more fully described below, the ensuing connection between the dictate station and the available recorder will cause the recorder to be seized and therefore unavailable thereby permitting the stepper switch W1 to again operate and to poll the recorders until another available recorder is found. In this manner, the recorders are polled to continuously provide a recorder available for dictation whenever a dictate station is taken off-hook and dictation is desired to be recorded.

The switch W1 also has a second level switch W4. Thus, the switches W1 and W4 are incremented simultaneously. The respective switch positions on the switches W1 and W4 are arranged such that when W1 is polling a particular recorder, the switch W4 is positioned at an output to the AND gate 204 which drives the W2 switch in the ACS21 which is associated with the polled recorder. As has been described above, the selection of an available recorder causes the switch W1 to be ground or to be placed in a logical zero condition. The logical zero condition of the switch W1 is provided to an inverter 202. The output of the inverter 202 is provided to the switch W4 thereby providing a logical one output to the appropriate AND gate 204 and the switch W3a, W3b, ... W3m or W3n with which the available recorder is associated. Thus, once a recorder has been selected as being an available recorder by the switch W1, the switch W4 provides an output which, as will be described below, causes the switch W2a, W2b, . . . W2m or W2n with which the recorder is associated to poll the various dictate stations in the dictations system for the presence of a dictate station which has been placed in the off-hook condition and from which dictation is desired to be recorded.

The individual stepper switches W2 sequentially poll the dictate stations 20a, 20b, ... 20m, 20n of the dictation system whenever a signal is provided to the appropriate stepper 228a, 228b, ... 228m, 228n. A signal is provided at the appropriate stepper 228a, 228b, ... 228m, 228n from the output of the respective AND gates 204a, 204b, ... 204m, 204n. The AND gates 204a, 204b, ... 204m, 204n will provide an output in response to the simultaneous presence of: (1) a signal from the clock; (2) a signal at the position of the switch W4 to which the particular switch W2a, W2b, ... W2 m or W2n is responsive and from which the particular AND gates 204a, 204b, ... 204m, or 204n are provided an input indicating that the particular recorder 22a, 22b, .. . 22m, 22n with which the particular switche W2a, W2b, ... W2m, or W2n is associated has been selected by the switch W2 and is available; and (3) a voltage or logical one signal from the respective switch W2a, W2b, ... W2m, W2n to which the particular AND gate 204a, 204b, ... 204m, or 204n provides an output.

Each of the dictate stations 20a, 20b, ... 20m, 20n is provided with a switch 226a, 226b, ... 226m, 226n. When the dictate station is in the on-hook condition, the switch 226a, 226b, ... 226m, 226n in the dictate station is in the open condition thereby placing a logical one input on the position of the switch W2a, W2b, ... W2m, W2n from which it is being polled. When the dictate station goes off-hook, the switch 226a, 226b, ... 226m, or 226n which is located in the dictate station is closed thereby placing a logical zero on the line to the position of the switch W2, W2b, ... W2m, or W2n from which the dictate station has been polled. When the presence of an off-hook dictate station places a logical zero at one of the positions of the switch W2a, W2b, ... W2m, or W2n which is presently polling the dictate stations, the switch W2a, W2b, ... W2m, or W2n stops when it reaches the position on the switch which is connected to the grounded dictate station which has gone off-hook. The switch W2a, W2b, ... W2m, or W2n is stopped when it reaches the dictate station by the existence of the logical zero condition at that position of the switch. The logical zero at the appropriate position on the switch provides a logical zero input to the AND gate 204a, 204b, ... 204m, or 204n which is associated with the polling switch W2a, W2b, ... W2m, or W2n. The presence of a logical zero input to the AND gate 204a, 204b, ... 204m, or 204n causes the respective AND gate to provide a logical zero output to the respective stepper coil 228a, 228b, ... 228m, or 228n thereby stopping the operation of the switch W2a, W2b, ... W2m, or W2n which has been polling the dictate stations.

Each of the switches W2a, W2b, ... W2m, W2n have a second level switch W3a, W3b, ... W3m, W3n, respectively. As has been described above, the particular recorders associated with the switch combinations W2a—W3a, W2b—W3b, ... W2m —W3m, W2n —W3n may be operatively connected to the dictate stations 20a, 20b, ... 20m, or 20n through the switches W3a, W3b, ... W3m, W3n. One of the control signals conventionally supplied by a dictation recorder is a signal indicating that the dictation recorder has been seized by a dictate station. This signal is supplied by the recorder through the appropriate W3 switch to the particular dictate station 20a, 20b, . . . 20m, 20n by which the recorder 22a, 22b, . . . 22m, or 22n has been seized. Additionally, these lines carry the audio and control inputs from the dictate station to the various recorders.

Once a previously available recorder is seized, the switch 221 in the recorder is opened thereby placing a logical one condition at the position at which the switch W1 had been stopped. The presence of the logical one condition at the switch W1 provides an input to the AND gate 201 thereby causing the switch W1 to again poll the various recorders in search of an available recorder. Additionally, the seizure signal is provided through the appropriate W3 switch to the dictate station 20a, 20b, . . . 20m, 20n which has seized the recorder. Each of the dictate stations 20a, 20b, . . . 20m, 20n is provided with a second switch 225 which is conventionally closed when the dictate station does not have seizure of a recorder. However, upon the receipt of a seizure signal from a recorder a signal is provided to the relay coils 225 in the appropriate dictate stations 20a, 20b, . . . 20m, or 20n which causes the switch 225 in the dictate station 20a, 20b, . . . 20m, or 20n which has seized the recorder to open. The opening of the switch 225 in the dictate station which has just seized the recorder places a logical one condition on the output which that dictate station provides to the switches W2a, W2b, . . . W2m, W2n. Thus, when the switch W1 selects another available recorder, the presence of the off-hook condition in the dictate station 20a, 20b, . . . 20m, or 20n which has seized the previously available recorder will not continue to provide a logical zero output and will not therefore stop the switch associated with the next available recorder from continuously polling the other dictate stations for an off-hook dictate station which has not yet seized a recorder.

It will now be understood by those skilled in the art that the switcher (ACS) 21 provides an apparatus for operationally connecting the various recorders of the dictation system to the dictate stations of the dictation system. This function is achieved by sequentially polling the recorders until an available recorder is located. Once an available recorder is located, a separate switching combination in the switcher associated with the available recorder then polls the dictate stations for the presence of a dictate station which is off-hook and has not yet seized a recorder. Once such a dictate station is found, the dictate station is operationally connected to the previously available recorder. The switcher then selects another available recorder and, using the switching combination associated with that recorder, polls the dictate stations for the presence of another dictate station which is off-hook and has not yet seized a recorder.

The apparatus whereby the switcher 21 provides the identification of the dictate station and the recorder upon which a particular piece of dictation has been recorded is described below. As is shown in FIG. 3A, the switching combinations W2a—W3a, W2b—W3b, . . . W2m —W3m, W2n—W3n, which poll the various dictate stations are operative in response to the outputs from the AND gates 204a, 204b, . . . 204m, 204n, respectively. The AND gates 204a, 204b, . . . 204m, 204n are each capable of causing the dictate stations to be polled by periodically providing a logical one ouptut to the appropriate stepper which causes the switch combination W2—W3 to move from one position to another. Additionally, at the same time that an output is provided to the steppers 228a, 228b, . . . 228m, 228n, the AND gate 204a, 204b, . . . 204m, 204n are so providing the same periodic output on lines 205a, 205b, . . . 205m, 205n. Thus, it will be seen that each time the AND gate 204a, 204b, . . . 204m, 204n provides a pulse causing a different dictate station to be polled, it also provides an output pulse on the output lines 205a, 205b, . . . 205m, 205n, respectively.

As is shown in FIG. 3A, the lines 205a, 205b, . . . 205m, 205n provide inputs to the counters 206a, 206b, . . . 206m, 206n causing the respective counters to which the inputs are provided to count to the next highest number. The capacity of each counter 206 should correspond to the number of positions on the switch combination W2—W3 which may be operatively connected for the recording of dictation. In this manner, a separate count on the counter 206 is provided for each possible position of each of the switch combinations W2—W3. Therefore, when the available recorder is polling a dictate station through its switch combination W2—W3, the counter will be incremented to a number which identifies the dictate station being polled. Moreover, when the dictate station is off-hook and the switch combination W2--W3 which is associated with the available recorder is stopped, then the counter 206 which is incremented only when the switch W2--W3 changes position will also be stopped and will remain stopped until the recorder becomes the next available recorder for dictation and resumes the polling of dictate stations.

Each of the counters 206 associated with each of the various recorders provides an input to a data selector 350. As will be more fully described below, the input to the data selector 350 is provided from a recorder when a loss of seizure signal is received from one of the recorders or, even though seizure is not lost, when one of the recorders ejects a full cassette. Depending upon the recorder from which the input signal is received, a different input is provided to the data selector 350. This input causes the data selector 350 to output the count occurring on the counter 206 corresponding to the recorder from which the input signal was received. The count on the counter 206 corresponding to the recorder from which the input signal was received identifies the dictate station which has been operatively connected to that recorder.

It will be understood by those skilled in the art that a dictation recorder provides a distinct signal when the seizure of the recorder is lost. As is shown in FIG. 3A, the presence of a loss of seizure signal from the recorder 22a provides a loss of seizure signal on the line 210a. The recorder 22b provides a loss of seizure signal on the line 210b. The recorder 22m provides a loss of seizure signal on the line 210m and the recorder 22n provides a loss of seizure signal on the line 210n. Additionally, it will be understood by those skilled in the art from a review of copending U.S. Patent application Ser. No. 554,476, filed Mar. 3, 1975, now issued as U.S. Pat. No. 4,024,354, assigned to Lanier Electronic Laboratory, Inc., which is expressly incorporated by reference herein, that a cassette dictation recorder may also provide an output signal 209a, 209b, . . . 209m, 209n when a cassette upon which dictation is being recorded is ejected without loss of seizure of the dictation recorder. Such a situation might arise when the length of a particular piece of dictation is greater than the remaining storage capacity of the cassette on which the recording of the dictation was started and the cassette becomes full and must therefore be changed before the dictation has been completed. As will be more fully described below, the identification of the dictate station and recorder must be provided under the aforesaid circumstances as well as loss of seizure. Therefore, the output 209a, 209b, . . . 209m, and 209n is connected at an OR gate with the respective loss of seizure outputs 210a, 210b, . . . 210m, and 210n at OR gates 208a, 208b, . . . 208m, and 208n, respectively to provide an output when any of the recorders 22a 22b, . . . 22m, and 22n either loose seizure or eject a cassette without loss of seizure. Thus, when recorder 22a either looses seizure or ejects a cassette without loss of seizure an output from OR gate 208a provides an output on line 207a; when recorder 22b either looses seizure or ejects a cassette without loss of seizure an output from OR gate 208b provides an output on line 207b; when recorder 22m either looses seizure or ejects a cassette without loss of seizure OR gate 208m provides an output on line 207m; and when recorder 22n either looses seizure or ejects a cassette without loss of seizure OR gate 208n provides an output on line 207n.

As is shown in FIG. 3B, the lines 207a, 207b, . . . 207m, 207n provide an input to an OR gate 352 and an encoder 351. The output from the OR gate 352 will be used to assign a serial number and to enable certain operations of the processor 24 as will be more fully described below. The inputs 207a, 207b, . . . 207m, 207n to the encoder 351 are encoded into binary outputs. Each of the different recorder input signals 207a, 207b, . . . 207m, 207n will cause a different binary output from the encoder 351. In this manner, the recorder from which the input signal 207a, 207b, . . . 207m, 207n is received may be identified according to the binary output of the encoder 351. Furthermore, as has been described above, the identity of the recorder from which the input signal 207a, 207b, . . . 207m, 207n has been received will cause the data selector 350 to provide an output identifying the dictation station with which the recorder was connected. Additionally, the output of the encoder 351 is provided to the processor 24 and to the apparatus for recording the information relating to a piece of dictation on the recording tape at the end of the dictation as will be more fully described below. It will now be understood that the automatic channel selector as has been disclosed enables the sequential polling of the recorders of the dictation system for an available recorder, and the polling of the dictate stations of the dictation system to detect an off-hook condition indicating that an individual desires to dictate at a particular polled dictate station. It will be further understood that upon the simultaneous occurrence of an available recorder and the polling of a dictate station in the off-hook condition, the automatic channel selector will operatively connect the available recorder to the dictate station.

Alternatively, an embodiment of the present invention may be used in connection with a dictation system in which ordinary telephones are connected to recorders by means of a telephone interface. Referring now to FIG. 2, it will be seen that a plurality of telephones 31a, 31b, . . . 31m, 31n may be interchangeably connected through ordinary telephone switching equipment to a telephone interface 32a, 32b, . . . 32m, 32n associated with the apparatus of the dictation system. These telephone interfaces are each connected to a recorder 22a, 22b, . . . 22m, 22n. The automatic switching and polling function is provided by the conventional telephone company telephone interface which connects a caller wishing to record dictation with the first available recorder through the appropriate telephone interface 32a, 32b, . . . 32m, 32n. The digital information identifying the caller and the digital information are added at the telephone interface 32a, 32b, . . . 32m, 32n, as described below. Additionally, the necessary digital information relating to the identity of the individual dictating on a particular recorder is provided to the processor 24 through the telephone interface multiplexer 33.

The telephone interfaces 32a, 32b, . . . 32m, 32n are modified to provide the identification information in the first predetermined number of signals from the telephone. Thus, the recorder will not be capable of being operated from the telephone signals until an identification number has been entered. Thereafter, the telephone signals will provide signals to the recorder to control the recorder and place it in the forward-listen, reverse, or record modes of operation.

Representative of the telephone interfaces is the detailed view of telephone interface 32a shown in FIG. 4. The telephone signals from either a Touch Tone brand telephone or a dial type telephone are received at the telephone interface 32 by the Touch Tone or dial decoder 425a. The decoder 425a converts the signals to digital signals for further processing and provides the digital signals to the OR gate 426a, the inputs of a binary encoder 429a and the inputs of the control encoder 431a.

The digital signals which are received at the control encoder 431a provide the appropriate inputs to the recorder to control the functions of the recorder. However, the control signals to the recorder are only provided after the control encoder 431a has been provided an enable signal from the latch 428a. As will be described below, the latch 428a will not provide an enable signal until an identification number has been entered at the telephone by the person wishing to dictate.

As the initial signals from the decoder 425 are provided to the OR gate 426a, the OR gate 426a provides a clock input to the counter 427a. The counter 427a will count from its starting position, usually zero, to a predetermined number at which an output will be provided to set the latch 428a. When the latch 428a is set by the counting of the first predetermined number of signals from the decoder 425a, a latch condition provides an enable output to the control decoder 431a. Thereafter, the control decoder 431a will be enabled and will process subsequent signals from the telephone decoder to provide control outputs to the recorder to cause it to be in the forward-listen, reverse or record modes of operation.

As has been described above in connection with the structure and operation of the preferred embodiment of the ACS 21, a logical one is placed on the line 210a when seizure of the recorder is lost. The logical one on line 210a will provide a logical one to reset the counter 427a and the latch 428a. The counter 427a and the latch 428a will then be in a condition so that when the next caller attempts to seize the recorder through the telephone interface 32a the identification number of the individual dictating will have to be entered before the telephone control inputs will be provided to the recorder.

As has been described above, the output from the Touch Tone or dial decoder 425a provides a digital input to a binary encoder 429. The binary encoder 429 takes the decimal input from the Touch Tone brand or dial decoder 425a and encodes it into binary digital signals. The output from the binary encoder 429 provides the input for a multiple bit latch 430. As will be understood by those skilled in the art, a multiple bit latch provides as a continuous output of the input which was present at the time the multiple bit latch was clocked. The clock input for the multiple bit latch 430 is provided by the output of the RS latch 428a. As has been described above, the RS latch 428a is set only after the identification number of the person wishing to dictate has been entered through the Touch Tone or dial decoder 425a. Thus, the binary encoder 429a will have provided all of the digital information necessary to identify the person wishing to dictate before it clocks the multiple bit latch 430a.

In the alternative embodiment of the present invention in which the dictation is provided from one of a plurality of telephone interfaces, the multiplexing operation shown in FIG. 3B is performed by a telephone multiplexer 33. The telephone multiplexer 33 is substantially the same apparatus as that shown in FIG. 3B and operates in substantially the same manner. Each of the telephone interfaces 32a, 32b, . . . 32m, 32n provide a digital signal identifying the person by whom the dictation was recorded as well as the recorder upon which dictation was recorded to the telephone interface 33. The outputs from the multiple bit latches 430a, 430b, . . . 430m, 430n provide digital inputs to the data selector 350. Additionally, at either loss of seizure or substitution of a full cassette without loss of seizure, the input signals 207a, 207b, . . . 207m, 207n provide the appropriate input to the encoder 351 and the OR gate 352 in the telephone multiplexer 33. As has been described above, the encoder 351 provides a digital signal which identifies the recorder which has ejected a cassette without loss of seizure or upon which seizure has been lost and the dictation finished. The output from the encoder 351 provides an input to the data selector 350 causing it to output the digital information relating to the dictation recorded on the recorder from which the input signal 207a, 207b, . . . 207m, 207n originated. The information provided by the data selector 350 is the same digital information which was initially provided to the data selector by the multiple bit latch 430a and is therefore the identification number of the person recording the dictation which was entered by that person before dictation could be recorded on the recorder.

Thus, it will be understood by those skilled in the art that the alternative embodiment of the present invention described above provides an apparatus for entering information identifying the person who has recorded dictation on a particular recorder and cassette. It will be further understood that the digital information relating to the recorder upon which the dictation has been recorded is automatically provided by the system and only the identification number of the dictator need be entered manually. Moreover, the manually-entered identification information is converted within the apparatus to digital information and is provided at the ejection of a cassette or the end of dictation along with the automatically generated recorder number.

II. PROVIDING INFORMATION ON LENGTH OF DICTATION, TIME DICTATION IS FINISHED, AND A SERIAL NUMBER TO IDENTIFY THE DICTATION

In addition to generating digital electrical signals identifying the dictate station or the individual dictating and the recorder upon which the dictation is being recorded, the preferred embodiment also provides an apparatus for generating digital electrical signals indicating the length of each piece of dictation recorded. As is shown in FIG. 5, each recorder 22a, 22b, . . . 22m, 22n contains a means for generating a signal when the recorder is recording on tape which has previously not been recorded. The means for providing such signals are known in the art and are particularly disclosed in connection with the recorder of U.S. Pat. Applications Ser. No. 554,476, filed Mar. 3, 1975; now issued as U.S. Pat. No. 4,024,354, 753,359, 753,360, now issued as U.S. Pat. No. 4,138,695 and 753,361, now abandoned all filed Dec. 22, 1976, and all assigned to Lanier Electronic Laboratory, Inc., which is incorporated herein by reference. Since the recorder will only generate such a signal when the recording is on tape which has been previously not been recorded on, no signals are generated when a person dictating reverses the tape and records over a length of previously recorded dictation. The signal resumes only after the person dictating records past the point at which the dictation previously ended and continues to dictate on unrecorded tape. Thus, an indication of the actual amount of recorded tape is provided.

In addition to a means for generating signals when a recorder, for example, recorder 22n, is recording on tape on which dictation has not previously been recorded, the recorder also has a clock input 302. The input from the means for identifying when the recorder is recording on unrecorded tape 301 is fed to an AND gate 303n along with the input from the clock input 302. The clock input 302 provides a pulse at predetermined intervals, for example, at one second intervals. The output from the AND gate 303n provides the input to a counter 304n and causes the counter 304n to count the seconds of dictation recorded by recorder 22n on tape which has previously not been recorded. The counter 304n is reset when a loss of seizure signal 210n is provided through the time delay 305n. Thus, whenever seizure is lost the time delay 305n will provide a reset signal to the counter 304n after a delay in time sufficient to allow the digital output of the counter to be stored in the master storage 25, as will be more fully described below.

In normal operation, the counter 304n will count the number of seconds of dictation recorded on previously unrecorded tape. This count will be kept throughout the period during which the recorder is seized by the particular dictate station. As will be more fully described below, when seizure is lost the digital electrical signals corresponding to the length of dictation on previously unrecorded tape will be provided through the processor 24 to the master storage 25. At that time the counter will be reset in order to count the length of subsequent pieces of dictation.

In addition to providing digital electrical signals identifying the dictate station or the person dictating, the recorder upon which dictation is being recorded, and the length of dictation, the real time the dictation is ended will also be recorded. As will be more fully described below in connection with FIGS. 7 and 12, the real time clock 31 provides an input to the processor 24. The first alternative embodiment of the processor 24 includes a multiple bit latch 606 to which the real time clock 31 provides a data input. The multiple bit latch 606 is set by the signal from any one of lines 207a, 207b, . . . 207m, 207n thereby providing the time that seizure was lost or a cassette was ejected without loss of seizure as an output from the multiple bit latch 606. The conventional microprocessor of the second alternative embodiment of the processor 24 is programmed to also store the real time of loss of seizure.

As has been described above, the recorders 22a, 22b, . . . 22m, 22n provide digital signals identifying the person dictating or the dictate station in use, the recorder on which the dictation is being recorded, the length of the dictation, and the time the dictation was completed. Additionally, a serial number is assigned to either each piece of dictation or to each cassette upon which dictation is recorded. In the embodiment described herein, the dictation system is a cassette dictation system such as that disclosed in U.S. Pat. Application Ser. No. 554,476, filed Mar. 3, 1975, now issued as U.S. Pat. No. 4,024,354 and U.S. Pat. Applications Ser. No. 753,359 now U.S. Pat. No. 4,075,436; 753,360, now U.S. Pat. No. 4,138,695 and 753,361, now abandoned, filed Dec. 22, 1976, all assigned to Lanier Electronic Laboratory, Inc. Therefore, the preferred embodiment will show an apparatus for assigning a serial number to each cassette upon which dictation is recorded unless a particular piece of dictation is carried over from one cassette to another in which case the subsequent cassettes on which the dictation is recorded will also be assigned the same serial number assigned to the first cassette on which the particular piece of dictation begins. However, it will be understood that the apparatus for assigning a serial number to a particular cassette hereinafter described may also be used to assign a serial number to each piece of dictation in a dictation system using a continuous loop recorder.

As has been described above and as is shown in FIG. 6, the loss of seizure of a recorder or the ejection of a cassette without loss of seizure places a logical one condition on line 207n in the recorder on which the dictation is being recorded. The one condition on line 207n is provided to set a latch 500n in the recorder on which dictation is being recorded. This set condition on the latch 500n triggers the monostable device 508n and provides an output to OR gate 501 in the processor 24. The OR gate 501 then provides a signal to the counter 516 in the processor 24 and the counter 516 provides the serial number.

It will be understood by those skilled in the art from a study of the cassette dictation recorder disclosed in U.S. Pat. Application Ser. No. 554,476, filed Mar. 3, 1975, now issued as U.S. Pat. No. 4,024,354 assigned to Lanier Electronic Laboratory, Inc., which is incorporated by reference herein, that cassette substitution may occur under a variety of conditions. A first condition which has been described above and which provides a signal on line 209n and therefore line 207n is cassette substitution when only a predetermined length of tape remains on a cassette for recording. Substitution under these circumstances occurs during the recording of dictation and does not loose seizure of the recorder during cassette substitution. Alternatively, substitution may occur at the end of the recording of a piece of dictation after the dictate station has lost seizure of the recorder. The substitution after loss of seizure occurs in response to a second condition in the cassette dictation recorder which is present after a predetermined number of separate pieces of dictation have been recorded on a particular cassette. In the description of the preferred embodiment of U.S. Pat. Application Ser. No. 554,476, now issued as U.S. Pat. No. 4,024,354 the second condition is referred to as the "priority" condition which causes cassette substitution at loss of seizure after each piece of dictation; however, it will be understood that this second condition may also be provided by the output of a counter or the like which provides the second condition only after a predetermined number of such losses of seizure. The second condition described above provides a logical one output on line 505n shown in FIG. 6.

In the preferred embodiment of a cassette dictation system, all of the pieces of dictation recorded on a particular cassette are assigned the same serial number and cassettes on which dictation is carried over from a first cassette have the same serial numbers as the first cassette. Therefore, it is not desired to assign a serial number to each piece of dictation when an input signal on line 207n indicates that the dictation has ended. Similarly, where an input signal on line 207n indicates that a cassette has been ejected without loss of seizure the subsequent cassettes on which the piece of dictation is continued are assigned the same serial number as the cassette on which the recording of the dictation was started and are not assigned a new serial number. These objects are achieved by not resetting the latch 500n to provide another signal to the monostable device 508n and therefore a new serial number until a logical one signal on line 505n is provided indicating that the recorder upon which the dictation is being recorded has ejected a cassette at the end of a piece of dictation in response to the second condition described above and is substituting a new cassette which will require a new serial number. Additionally, each recorder is provided with a counter 503n which counts in response to the loss of seizure signal on line 210n. The purpose of the counter 503n is to count the units of dictation which have been recorded on a particular cassette and to provide an output signal indicating whether a particular piece of dictation is the first, second, third, or nth piece of dictation recorded on a particular cassette. The counter 503n counts each time a loss of seizure signal occurs on line 210n. The counter 503n is then reset whenever a logical one condition appears on line 505n indicating that the previous cassette has been ejected at the end of a piece of dictation and a new cassette is being substituted. The count from the counter 503n is combined with the serial number to provide an address in the master storage 25 for all information related to a particular piece of dictation.

The counter 516 in the processor 24 also provides the serial number to a multiple bit latch 512n in the recorder n from which the signal which generated the serial number originated. The multiple bit latch 512n is enabled to store the serial number whenever an output is provided from the trigger 508n generating a new serial number. However, a short time delay 509n is provided in order to permit all of the digital information from the counter 516 to be provided to the inputs to the multiple bit latch 512n before the multiple bit latch 512n is enabled to store the data at its inputs.

The serial number temporarily stored in the multiple bit latch 512n will be available to be stored in the main storage 25 along with the other information provided in connection with each subsequent piece of dictation.

It should be noted that a serial number may also be generated by an external entry from the keyboard 30 and specifically the external entry key 30d. Thus, a signal generated by closing key 30d provides a logical one input to the OR gate 501 and causes the counter 516 to generate a serial number. The serial number from the counter 516 is combined with an "o" unit of dictation count to provide an address for the information related to the externally entered project in the master storage 25. As will be more fully described below, this serial number is generally related to project information manually entered into the apparatus through the keyboard and is provided directly to the master storage 25.

It will now be understood by those skilled in the art that the preferred embodiment is an apparatus which is capable of generating digital electrical signals identifying the person dictating or the dictate station in use, the recorder upon which dictation is being recorded, the length of the dictation, the time the dictation is completed, and a serial number identifying either the piece of dictation or the cassette upon which the dictation is recorded. As will be more fully described below, the digital information is stored in the master storage 25 whenever the particular recorder 22a, 22b, . . . 22m, 22n, to which the digital information pertains provides a loss of seizure signal.

III. AUTOMATIC PROCESSING AND STORAGE OF PROJECT INFORMATION

The automatic processing and storage of project information may be achieved by a first alternative embodiment using a circuit comprising digital hardware or by a second alternative embodiment using a programmed microprocessor. It will be understood that the following alternative embodiments are merely illustrative and that the functional equivalents of the processor 24 may include other digital devices, including digital hardware, firmware, or software, which are capable of performing the described functions in a central control system.

Each of the recorders 22a, 22b, . . . 22m, 22n are capable of providing a signal indicating the loss of seizure of the recorder and signal indicating ejection of a cassette without loss of seizure. These signals are placed on one of a plurality of lines 207a, 207b, . . . 207m, 207n, indicated representatively as line 207n in FIG. 7, and provided to an OR gate 601 in the first alternative embodiment. The output of the OR gate 601 provides an enable input to the master storage 25a. Additionally, as will be further described below, the OR gate 601 has inputs which are provided by the operation of the priority key 30a, and the external entry key 30d of the keyboard 30; and an input from the direct memory access 1204, all to be more fully described below.

The master storage 25a remains in the write mode of operation when enabled unless the OR gate 675 provides a logical one to the read/write input of the master storage 25a. The OR gate 675 is only responsive to provide said logical one signals in response to signals which cause master storage 25a to read the stored information into another priority address during the priority operation, or to read the information into a video processor. Therefore, upon the receipt of a signal from OR gate 601, the master storage 25a is enabled to write the address and data information provided from the particular recorder upon which seizure has been lost.

The address information includes the serial number and unit of dictation count assigned to the piece of dictation, as described above, to which a constant P is added by the constant adder 604. From the constant adder 604, the address is then provided to a data selector 683 and, unless the master storage 25a is in the process of assigning the data a new priority address, the data selector 683 provides the serial number and unit of dictation count plus the constant P as the address to the master storage 25a. Additionally, the serial number and unit of dictation count are sufficient to provide an address in the master storages 25a, 25b, 25c and 25d upon which the additional data relating to a particular piece of dictation will be stored as will be more fully described below.

As has been described above, the identification of the individual dictating or the dictate station as well as the recorder upon which dictation has been recorded provide outputs from the data selector 350 and the encoder 351 upon the loss of seizure or substitution of a cassette without loss of seizure by one of the recorders 22a, 22b, . . . 22m, 22n. The outputs from the data selector 350 and encoder 351 are provided to the appropriate data or information inputs to the master storage 25a. Additionally, in the case where the information is provided through an external entry 30d, the dictate station identification and recorder number may be entered manually from the keyboard inputs 30g and 30h. As will be described more fully below, the data entered as the dictate station identification may still identify the person who originates the project and the data entered as the recorder number may indicate the form of the project, for example, transcription of handwritten material.

Additionally, the length of the dictation on previously unrecorded tape has been counted by a counter in each recorder, representatively shown as counter 304n in FIG. 5. The counter 304n provides a data input to the master storage 25a and, upon the enabling of the master storage 25a, is written into the master storage. As has been described above, the counter 304n is reset at loss of seizure of the recorder in order to count the length of each piece of dictation recorded on the cassette or tape. As will also be described more fully below, the approximate length of a project may also be entered from the keyboard at data input 30j.

The real time clock 31 provides an input to the master storage 25a when the master storage 25a is enabled by the input signal 207n. The real time of loss of seizure or cassette substitution without loss of seizure is therefore also written into the master storage 25a. Similarly, the real time an external entry is entered is also written into the master storage 25a when it is enabled.

Additionally, the serial number and unit of dictation count is also provided as a data input to the master storage 25. Thus, the serial number and unit of dictation count not only provide a part of the address in the master storage 25a for the information, but also are stored as information which, as will be described more fully, may be presented visually on a video display or printed from the master storage 25a. As will be more fully described below, the serial number and unit of dictation count will also be necessary for the external entry or supplementation of information in the master storages 25b, 25c, and 25d relating to the cassette.

It will now be understood that the master storage 25a is enabled by the loss of seizure or the substitution of a cassette without loss of seizure by a particular recorder upon which dictation has been recorded. Upon enablement, the master storage 25a stores the serial number and unit of dictation count assigned to the dictation, the identification number of the person dictating or the dictate station, the number of the recorder upon which the dictation has been recorded, the length of dictation, and the time that the recording of the dictation was finished. All of this information is stored as digital signals in the master storage 25a at an address designated to be the serial number and unit of dictation count plus a constant.

As will be more fully described in the operation of the present apparatus, the first and second alternative embodiment of the present invention provide an apparatus for tracking the progress which has been made in the completion of the projects identified and stored in the master storage 25. Additionally, it provides an apparatus for rearranging the projects in the master storage 25 according to the priority assigned their completion. These projects are the pieces of dictation which have been recorded on the recorders to which the master storage is attached, or projects which have been entered manually through the keyboard 30.

Referring now to the first alternative embodiment, the progress of each of the projects will be tracked in the master storages 25b, 25c, and 25d and the information in the master storages 25b, 25c, and 25d may be revised according to the progress which is being made in completing the project. One such entry is the entry of the identification number relating to the person to whom the project has been assigned for completion. This number, identified in the dictation system as the transcriptionist number, is entered into the master storage 25b along with the time the transcriptionist is initially assigned a project.

The transcriptionist number is entered into the master storage 25b by providing an input at the keyboard at the input 30e. The input 30e may be generated as digital informatio in the conventional manner either through a keyboard or through thumb wheel switches. First, the serial number and the unit of dictation count of the dictation to be assigned the transcriptionist is entered at the input 30f. The digital signal carrying the serial number and unit of dictation count provides an input from the keyboard to provide the address in the master storage 25b where the information relating to the cassette to be assigned is to be stored. As will become more apparent, the constant P need not be added to provide the address of the data in the master storage 25b since the information stored in the storage 25b is not moved to a priority address.

The identification number assigned to the transcriptionist is entered next. A direct data input 30e from the keyboard to the master storage 25b is provided. Additionally, the real time clock 31 also provides an input to the master storage 25b.

Thirdly, the assign out key 30b is operated. The operation of the assign out key 30b causes the data selector 678 to substitute the constant 679 for the constant 697 to replace the blank status input with an "A" status input which is a status input for the master storage 25d to identify the assigned out status of the project. The constant corresponding to the "A" assigned out status symbol is thereby provided to the master storage 25d at the address set by the operation of the serial number and unit of dictation count input 30f. The master storage 25d is also enabled to write the constant into the storage by the output of the OR gate 696 in response to the input from the operation of the assign out key 30b. The operation of the assign out key 30b also provides an input to the OR gate 605 which in turn enables the master storage 25b to write the transcriptionist identification number and the real time assigned out at the appropriate address at which the information related to the assigned dictation is intended to be stored.

Once the transcription of the dictation recorded on the cassette is completed, the information stored in the master storages 25a and 25b may be supplemented to reflect its completion. The serial number of the cassette and unit of dictation count of the dictation transcribed is entered on the keyboard in the same manner as the serial number and unit of dictation count were entered when the cassette was assigned out, as has been described above. The real time clock 31 also provides an input to the master storage 25c. The complete key 30c is then operated. The complete key 30c provides an input to the data selector 678 which causes the data selector 678 to provide a constant 681 corresponding to the letter "C", for "completed" at the data input to the master storage 25d. The serial number and unit of dictation count entry at 30f also provides an address input to the master storage 25d. The operation of the complete key 30d also provides an input to the OR gate 606 which provides an enable input to the master storage 25d to enable the "C" status symbol to be written into the master storage 25d at the appropriate address thereby replacing the previously entered "A" status symbol. Finally, the operation of the complete key 30c provides an input to the OR gate 607 providing an enable input to the master storage 25c thereby enabling the real time the project was completed to be written into the master storage 25c at the address at which the information related to the completed project is stored.

It will now be understood by those skilled in the art that the information stored in the master storage 25a may be supplemented in the master storages 25b, 25c, and 25d by additional information relating to the progress being made toward the completion of the projects identified in the master storage 25a. In the context of the dictation system of the preferred embodiment, this information includes the status of the project, the identification number of the person to whom the dictation has been assigned for transcription, and the real time at which the dictation was assigned to the transcriptionist and completed by the transcriptionist. As will be more fully described below, all of this information will be available for visual display or printing from the master storage 25.

In addition to supplementing the digital information stored in the master storage 25a, those items which are of such importance tht their completion takes precedence over other projects which have been stored in the master storage 25a earlier may be assigned priority. In assigning a project priority, the project information is duplicated at a priority address in the master storage 25a so that it will be displayed on the CRT ahead of all non-priority projects. Additionally, a status symbol "P" will be entered into the master storage 25d at the original non-priority address along with the other digital information relating to the project.

Priority is assigned to a project by first entering the serial number and unit of dictation count of the project from the keyboard input 30f. The serial number and unit of dictation count are then provided to the constant adder 604 where the constant "P" is added to the serial number to give the address of the project and through a data selector 683 to the address input of the master storage 25a. The "priority" key 30a is then operated. Initially, the operation of the priority key provides an input to the data selector 678 which in turn provides a digital signal from the constant 684 corresponding to a "P" status symbol. The master storage 25d is then enabled to read the status input from the data selector 678 into the storage by an input from the priority key 30a through the OR gate 606 to the enable input of the master storage 25d.

Once the status information is stored in the master storage 25d along with the other information relating to the project, the master storage 25a is enabled to read the information at the address relating to the project to which priority has been assigned into a multiple bit latch 686. This is done by placing the master storage 25a in the "read" mode of operation by the input from the priority key 30a through a timer 689 and thence through the OR gate 675 to the read/write input of the master storage 25a. It will be understood by those skilled in the art that when the OR gate 675 provides a logical one input to the read/write input of the master storage 25a, the master storage 25a will provide a data output when enabled; conversely, when a logical zero is present at the read/write input, the master storage 25a will store input data when enabled. Moreover, the presence of the timer 689 limits the period during which the master storage 25a will be in the read mode of operation to the period of time required to transfer the data from the master storage 25a to the multiple bit latch 686 as will be described below.

At the same time that the operation of the priority key 30a causes the master storage 25a to be in the read mode of operation, the priority key 30a also provides clock input to the multiple bit latch 686 to enable it to read the data provided from the master storage 25a. Typically, the multiple bit latch 686 will have only enough storage capacity to accommodate the digital signals related to the information stored about one project in the master storage 25a. Therefore, an address to the temporary storage 686 is unnecessary.

Once the data related to a particular object is stored in the multiple bit latch 686, a priority address in the master storage 25a is chosen and the data is written from the multiple bit latch 686 back into master storage 25a at the priority address. The priority address is chosen by the operation of a priority address counter 687 which counts in response to the operation of the priority key 30a. Thus, each priority address is chosen sequentially in the order the project is assigned priority by the operation of the priority key 30a.

It will be understood by those skilled in the art from the earlier description of the assignment of addresses in the master storage 25a that the first "P" addresses in the master storage 25a will have been left open for the entry of later priority projects. This has been accomplished by incrementing the serial number and unit of dictation count assigned each project by the constant number "P" at the constant adder 604 to provide the address to be assigned each ordinary project in the master storage. Therefore, none of the ordinary projects will have been entered into the master storage 25 at an address less than "P+1."

A priority address is assigned each priority projected. The operation of the priority key 30a causes the priority address counter 687 to count to the next available priority address and provide that priority address to the data selector 683.

After a delay sufficient to have allowed the project data to be temporarily stored in the multiple bit latch 686, the delay 688 provides an output to the data selector 683 in response to the initial operation of the priority key 30a. The output of the delay 688 is provided to the data selector 683 to cause the data selector to select the priority address from the priority address counter 687 as the address which is provided at the address input of the master storage 25a. By the time that the delay 688 provides an output, the timer 689 will have ceased providing an output causing the master storage 25a to be in the "read" mode of operation and therefore when next enabled, it will be enabled to "write" the information at the data inputs of the master storage 25a into the master storage 25a at the priority address.

Finally, the delay 688 provides an enable input through the OR gate 601 to the master storage 25a. Thus, the master storage 25a is enabled to write the information temporarily stored in the multiple bit latch 686 back in at the priority address. As will be more fully described below, the data relating to the priority project will now be available for display on the video display 26 at a position above all of the projects over which it has been assigned priority.

As has been described above, the first alternative embodiment described above will achieve the objects and advantages of the present invention; however, a second alternative embodiment of the central control system may also provide the objects and advantages of the present invention. In the second alternative embodiment, the processor 24 is a conventional microprocessor programmed according to the flow diagram shown in FIG. 12. The apparatus for providing the identification of the person dictating, the identification of the recorder by which the dictation was recorded, the length of dictation, the serial number assigned the dictation and the time the dictation was completed are all the same in both the first and second alternative embodiments of the present invention.

Additionally, the second alternative embodiment of the present invention is capable of performing certain further processing functions such as the computation of the difference between the time a cassette was made available for transcription and the time it was actually assigned out to a transcriptionist; the difference between the time a cassette was assigned for transcription and the time the transcription of the dictation recorded on the cassette was completed; a listing of all dictation originating from a selected dictate station or individual; a listing of all dictation assigned to a particular transcriptionist; the total length of dictation originating from a selected plurality of dictate stations associated with a particular department; the total length of dictation transcribed by a transcriptionist; and a signal from the cassette recorder indicating that a cassette recorder has recorded on all of the available cassettes and that reloading of the dictation recorder is necessary before further dictation may be recorded. The processed information described above is available for visual presentation either on a video display or by printing on a printer in the conventional manner.

The sequence of operations by which the programmed microprocessor performs the desired functions is illustrated in FIG. 12. A start function 1301 is the first function which the conventional microprocessor is programmed to perform. The microprocessor then performs a polling function in an idling mode of operation 1302. The idling mode of operation 1302 causes the microprocessor to poll its inputs for information provided from the recorders 22a, 22b, . . . 22m, 22n and the ACS 21 or telephone interface 33 upon the loss of seizure of a recorder or the substitution of a cassette as has been described above. Additionally, the microprocessor polls the real time clock 31, the cassette reader 29 and the keyboard 30 for inputs.

Upon receipt of an input 1303 from the keyboard 30, the microprocessor further processes the information inputs and the information stored in the master storage 25 by performing the functions 1304–1308, 1314–1317, and 1320–1322. Thus, upon the entry of keyboard input calling for the total dictation transcribed by a transcriptionist 1304, the microprocessor is programmed to cause the data identifying the length of dictation recorded on each of the cassettes completed by to a particular trnscriptionist to be summed and visually presented. The entry of keyboard input calling for the reset of the total dictation transcribed by a transcriptionist 1305 causes the microprocessor to start any such subsequent summing operation from the time of reset. The keyboard input 1303 calling for setting the time 1306 causes the microprocessor to set the real time clock 31 to the time input from the keyboard. The external entry input 1307 causes the microprocessor to assign the external entry a serial number as has been previously described; store the external entry; and cause the video display of the information externally entered to be flashingly displayed. The dictate station or individual dictation list input 1308 causes a list of the information relating to the various pieces of dictation originating from a particular dictate station or individual dictation to be visually presented either on a video display or by printing on a printer. Similarly, the transcriptionist list input 1309 causes a list of the information relating to the various pieces of dictation assigned to a particular transcriptionist for transcription to be visually presented either on a video display or by printing on a printer.

The conventional microprocessor may also be programmed to shift information related to various projects to different preselected addresses in the master storage 25 according to their status. Thus, the priority input 1315 causes the information relating to a selected project to which a priority status has been assigned to be shifted to a priority address in the master storage 25 where it will be visually presented before other earlier, but non-priority, projects. The assign out input 1316 causes the status symbol associated with the project to be displayed as an "A"; the information related to the assigned project to be shifted to a section of the master storage 25 reserved for projects assigned out; and causes the printer to print the project information relating to the assigned project and the difference in time between the initial entry of the project into the system and the time assigned out to a transcriptionist. The work complete entry 1317 causes the status symbol associated with the project to be displayed as a "C"; the information related to the completed project to be shifted to a section of the master storage 25 reserved for completed projects; to add the length of the project to the totals for the length of dictation transcribed by a particular transcriptionist and the length of dication originating from a department; and to print the information related to the project on a printer along with the difference in time between the time assigned to the transcriptionist and the time completed by the transcriptionist. It will be understood by those skilled in the art that all of the projects about which information is stored in the master storage 25 cannot be displayed at the same time on the video display. Therefore, different "pages" of information are displayed separately. The display reset 1314 causes the display to return to the page at which the information related to unassigned projects is first displayed.

As has been described above, the toal lengths of dictation transcribed by a particular transcriptionist as well as the total length of dictation originating from a given department are also displayed. Additionally, a summary of all of the transcriptionist totals is displayed in response to the T summary input 1320. Similarly, a summary of all of the department totals is displayed in response to the D summary input 1321. The D summary reset input 1322 resets the department totals to zero.

In addition to the functional inputs entered from the keyboard inputs 1303, the real time clock 31 provides a real time clock input 1310 to the microprocessor. The real time clock input 1310 provides a video display of the date and time; a date and time input to the master storage 25; and an input to the length of dictation counter 304 associated with each of the recorders on which dictation is being recorded.

As will be more fully described below, the microprocessor should also be programmed to be responsive to the input 1311 of the cassette reader 29. The cassette reader 29 provides a digital input 1311 identifying the serial number of the cassette which has been inserted into the cassette reader. Upon the input 1311 of this serial number, the microprocessor should be programmed to cause the information in the master storage 25 relating to the identified cassette to be visually presented either by a flashing video display or by printing either on a conventional printer or a label printer.

The microprocessor must also be programmed to process the digital information identifying either the dictate station or the person recording the dictation which may be provided from either the ACS 21 or the telephone interface multiplexer 33. The input 1313 may also cause the microprocessor to perform the function of temporarily storing the dictate station or dictator identification number until that number is to be stored in the master storage along with the recorder number upon loss of seizure or cassette substitution.

The input of recorder data 1312 also causes a plurality of functions to be performed by the microprocessor. Initially, a cassette dictation recorder may provide a signal when the cassettes loaded in the recorder are all full and the recorder must be reloaded. In response to the reload signal 1318, the microprocessor should be programmed to cause a special reload message to be displayed on the video display along with the identification number of the recorder which must be reloaded.

Another recorder input is the cassette eject input 1319. Upon receipt of the cassette eject input, the microprocessor should be programmed to record the information relating to the last piece of dictation on the cassette at the end of the cassette. Then the microprocessor should cause the cassette to be ejected from the recorder.

A third input which may be received by the microprocessor from a recorder is the loss of seizure input 1323 indicating that a dictate station or telephone interface has lost its seizure of a particular recorder. Upon the receipt of the loss of seizure input 1323, the microprocessor should be programmed to assign a serial number to the cassette if the input 1323 is the first dictation entry on the cassette. Once a serial number has been assigned the cassette, the information relating to the dictation which has just ended must be stored in the master storage 25. The information should include the dictator identification number of the dictate station or the person dictating, the recorder number, the serial number of the cassette, the length of dictation and the real time of loss of seizure. Third, the microprocessor should provide a reset input to the length of dictation counter 304 in the recorder on which the dictation was recorded.

It will now be understood to those skilled in the art that a second alternative embodiment of the present invention may include a conventional programmed multiprocessor, programmed to perform the functions described above and illustrated by the flow diagram in FIG. 12. Moreover, it will be understood that the inputs to the microprocessor are from the digital devices associated with the other components of the central control system described herein and that the outputs are a conventional storage memory, video display and printer.

IV. RECORDING DICTATION IDENTIFICATION INFORMATION ON A CASSETTE

In addition to storing the information relating to a project as either a priority project or a project to be completed in due course in the master storage 25a, the preferred embodiment also provides a means of recording this information on the cassette upon which the dictation was recorded. As has been described above, one of the disadvantages of a cassette recorder dictation system is that the cassettes cannot be easily identified. The recording of this information and the provision of a means for playing back this information without having to play back the entire cassette provides a means for identifying the cassettes.

In order to understand the apparatus by which and the method in which the information is recorded on the cassette at the end of the dictation, it is necessary that they first be broadly described. At the end of the last piece of dictation on the cassette, or in any event, prior to the ejection of a cassette from the recorder, the preferred embodiment will cause digital signals containing the information as to the serial number of the cassette, the time the cassette was ejected, the identification number of the person dictating or of the dictate station, the recorder number, and the length of the dictation to be recorded on the end of the tape following the dictation. In the preferred embodiment, a central supervisor station is provided which includes a display 26, and a cassette reader 29. The cassette reader 29 in the preferred embodiment operates by playing back that portion of the tape upon which the digital information has been recorded. Once this information has been played back on the cassette reader 29, those lines of information in the master storage 25a corresponding to the identified cassette which are displayed on the display 26 will be caused to be flashingly displayed thereby identifying the cassette which has been inserted into the cassette reader 29. Additionally, a label printer 28 may operate to print a label in response to the digital signals played back on the cassette reader 29. This label may then be physically attached to the cassette in order to facilitate later identification.

The primary advantage of this feature is that the cassette need not be rewound, played back and rewound again to attempt to identify the cassette by the sound of the voice of the person who was dictating or the subject of the dictation. Instead, positive identification is provided merely inserting the cassette into the cassette reader 29.

In order to manufacture the preferred embodiment of the cassette reader 29 from parts which are generally available and to minimize the degree of modification which must be made in the cassette reader 29, the digital information recorded on the end of the tape following the dictation must be recorded in reverse order from the order it will be played back. As is shown in FIG. 8, the direction of tape movement past the magnetic head 802 in a recorder is from right to left. Similarly, on a tape playback machine the direction of tape movement during the playback operation is usually also from right to left. In the preferred embodiment of the present invention, it will be desired to read back the digital information recorded on the tape at the end of the dictation by turning the cassette over to the side opposite the side on which the dictation had originally been recorded before inserting it into the playback machine. Ordinarily, the effect of turning the cassette over would be to cause the playback machine to play back anything recorded on a track T2 opposite the track T1 on which the dictation and the digital information have been recorded. However, in the preferred embodiment a modification of the playback machine is made and the magnetic head is displaced from its ordinary position to a position in which it will play back signals recorded on the track T1. Since the cassette has been inverted, the first material which will be encountered in playing back the cassette will be that material which was last to be recorded. The information last to be recorded is the digital information identifying the cassette. Moreover, this digital information will be played back in reverse order from the order in which it was recorded. Thus, it will be necessary to initially record the digital signals in reverse order so that when played back backwards from the order in which they were initially recorded, they will be played back in the proper order.

It will now be understood by those skilled in the art that the preferred embodiment of the present invention will provide a means whereby a cassette may be identified by reference to digital signals recorded at the end of the dictation. This result is achieved by inverting the cassette and inserting it into a cassette recorder adapted to play back the material on the inverted track. Additionally, when the inverted cassette is played back the first recording to be played back will be the last recording which was recorded. Thus, the digital signals recorded at the end of the dictation will be played back immediately and before the dictation is played back. Finally, since the digital information has been recorded in reverse order, playing it back in what is effectively the reverse direction from the direction in which it was originally recorded will cause the digital signals to be played back in the proper order.

The means for recording the digital information on the tape at the end of the dictation will now be described. As is shown in FIG. 9, a multiplexer data selector 801 is provided with an input from the length of dictation counter 304n, the data selector 350 providing the dictate station number and the encoder 351 providing the recorder number, a time in multiple bit latch 606 (shown in FIG. 7), and the serial number counter 604. The multiplexer 801 functions to arrange these inputs in the order in which they will be recorded on the tape. Since the order in which they will be recorded on the tape is the reverse order from that in which they will be played back and ultimately visually displayed and printed on a label, the multiplexer first passes the digital signal from the length of dictation counter 304n, and then sequentially passes the recorder number from the encoder 351, the dictate station number from the data selector 350, the time the dictation was placed in the system real time multiple bit latch 606 and the serial number of the cassette from the serial number counter 604. The rate of operation of the multiplexer 801 is established by a counter 805 which is responsive to a clock input and to the output of an OR gate 825. The inputs to the OR gate 825 are provided by the lines 505n and 209n. From the description of the conditions which provide an output on lines 505n and 209 which is set forth above, it will be understood that the OR gate 825 will provide an output upon cassette substitution either after loss of seizure or without loss of seizure. Thus, the multiplexer 801 will provide data to be recorded at the end of each cassette before the cassette is ejected and regardless of whether a piece of dictation has been completed. Additionally, an input signal is provided on each cassette substitution from the OR gate 208n on line 207n in order to provide the data input from the data selector 350, the encoder 351, and the real time multiple bit latch 606. The multiplexer 801 sequentially passes the digital information one byte at a time and in reverse order to the shift register 807.

The shift register 807 then serially clocks the bits of information to the NAND gate input 815 and, through an inverter 816, to the NAND gate input 817. The NAND gate 815 also has an input from a "1" timing monostable which is clocked at the same rate that the bits of digital information are clocked out of the shift register 807. Similarly, a "0" timing monostable provides an input to the NAND gate 817. It will be understood by those skilled in the art that a timing monostable device provides an output for only a predetermined period of time upon being clocked. As will be more fully described below, the predetermined output period for the "1" timing monostable device 818 must be shorter than the predetermined output period for the "0" timing monostable device 819.

When the shift register 807 shifts out a bit corresponding to a logical zero, a zero input is provided to the NAND gate 815 causing it to maintain a logical one output despite the input from the "1" timing monostable 818. A zero output from the shift register 807 will, however, be inverted by the inverter 816 to provide a one input to the NAND gate 817. Thus, when the "0" timing monostable 819 provides an output of predetermined period the NAND gate 817 will provide a zero to the AND gate 820 for the period of the output of the "0" timing monostable 818.

When the shift register 807 shifts out a bit corresponding to a logical one, a one input is provided at the NAND gate 815 so that when the "1" timing monostable 818 provides an input for its predetermined period of time the NAND gate 815 will provide a zero to the AND gate 820 for the period of the "1" timing monostable 818. However, the logical one from the shift register 807 is inverted to a zero by the inverter 816 and therefore the NAND gate 817 will provide a continuing one output despite the input from the "0" timing monostable 819. It will now be understood by those skilled in the art that the AND gate 820 will maintain a logical one output unless interrupted for the period of the "1" timing monostable 818 when a logical one is shifted out of the shift register 807 or interrupted for the period of the "1" timing monostable 819 when a logical zero is shifted out of the shift register 807.

The signals from the AND gate 820 are superimposed upon an oscillator signal from an oscillator 812 at the AND gate 808 when the timer 810 provides an input indicating that the cassette ejection signal has been generated and only a predetermined period of time will be allowed during which to record the digital information on the end of the tape. The output of the timer 810 also provides a timed control signal to the recorder to cause the recorder to operate in the record mode of operation for the period required to record the digital information on the tape. Additionally, the timer 810 delays the eject signal by generating a timed output which is inverted by the inverter 809 to obtain a timed delay in the transfer of the eject signal through the AND gate 811 to the recorder by which the dictation was recorded, for example a recorder n.

The output from the AND gate 808 provides an oscillator signal to the recording head 802n at the recorder n. The recorder n then records the digital information as gaps in the oscillator tone, a digital one being a shorter gap and a digital zero being a longer gap.

The eject circuit is also modified by placing an AND gate 811 between the generation of the eject signal and the control mechanism of the recorder which causes the cassette to be ejected. The other input to the AND gate 811 is provided by a timer 840 which is set in response to the initial generation of the eject signal. The timer 840 will not provide an output for a period sufficient to permit all of the necessary data to be recorded as digital signals on the tape following the last dictation. Once this period has elapsed, however, the timer 840 provides an output to the AND gate 811 thereby providing an eject signal to the control mechanism within the recorder which causes the tape cassette to be ejected.

As has been described above, a cassette reader 29 is provided at the supervisor station in the preferred embodiment of the present invention. The purpose of the cassette reader 29 is to play back the information recorded on the end of the cassette following the dictation in order to identify the cassette so that they may be properly labeled and set aside for later transcription. The cassette 810 is inverted and inserted into the cassette recorder having a displaced playback head 803, as shown in FIG. 8B. The insertion of the cassette into the cassette reader 29 causes the motor of the cassette reader to move the tape past the displaced playback head 803 of the cassette reader 29. As the cassette 810 is played back in effectively the reverse direction from the direction in which it was recorded, the last digital signals recorded will be the first digital signals to be played back. As has also been described, the digital signals have been superimposed upon a carrier for recording on the tape following the dictation. As is shown in FIG. 10, the carrier is detected when played back and amplified by a detector and amplifier 901. The detection of the carrier by the amplifier and detector 901 provides an input to an edge trigger timing generator 904. Additionally, the output from the amplifier and detector 901 provides an input to a shift register 903. As will be described below, the length of the shift register 903 is sixteen bits in order to accommodate all of the digital information necessary to identify the cassette. In addition to having an input from the detector and amplifier 901, the clock input of the shift register 903 is provided by the output of the edge trigger timing generator 904. The period of the timing generator 904 is selected to be longer than the period of the gap associated with a digital one and shorter than the period of the gap associated with a digital zero. Thus, the shift register 903 will sample the input from the amplifier and detector 901 periodically and, if a carrier is detected, then the period of the gap in the carrier has been shorter than the period of the clocking generator 904 and a digital one is entered in the shift register 903. Similarly, if at the end of the timing period of the timing generator 904 a carrier is not detected, then the period of the gap in the carrier was longer than the timing period of timing generator 904 and a digital zero will be entered in the shift register 903.

As will be more fully described, the only information which the reader in the preferred embodiment of the present invention must receive is that information relating to the serial number of the cassette. Thus, the reader is also provided with a counter 905 which will count the playback of the first sixteen bits of information from the tape 810. Upon receipt of the necessary sixteen bits of digital information which contain the serial number of the cassette, the counter provides an output to the reader 29 which causes the cassette to be ejected from the reader.

As is shown in FIGS. 1 and 2, the master storage 25 is operatively connected with a display 26 and a label printer 28. The display 26 may be an ordinary cathode ray tube. As is shown in FIG. 11, the display 26 is operatively connected to the master storage through a conventional CRT driver 1201. The CRT driver 1201 includes conventional digital character generator responsive to the digital output of the master storage 25 for providing a visual display of the digital information on the display 26. The portion of the master storage 25 displayed on the CRT is determined by the address provided by a direct memory access (DMA) 1203. As is shown more clearly in FIG. 7, the direct memory access provides the master storages 25a, 25b, 25c and 25d with address, read, and enable signals which permit the output to drive the CRT driver 1201 and present the digital information visually on display 26. The address signals are provided at the line 695 which is the input to the constant adder 604 for master storage 25a, and directly to the address inputs of the master storages 25b, 25c, and 25d. The DMA 1204 provides a "read" signal through the OR gate 675 to the master storage 25a, and directly to the write/read inputs of the master storages 25b, 25c, and 25d. The DMA 1209 provides an enable input to the master storage 25a through the OR gate 601, the master storage 25b through the OR gate 605, the master storage 25c through the OR gate 607, and the master storage 25d through the OR gate 606.

The display 26 also provides a visual identification of cassettes which are inserted into the cassette reader 29. As has been described above, the serial number of the cassette upon which dictation has been recorded is itself recorded as digital information on the tape in the cassette following the dictation. The cassette reader 29 reads the digital information and provides a digital output of the serial number. The serial number of the cassette read by the cassette reader 29 is then provided to a digital comparator 1206 which compares the serial number of the cassette with the serial number of the projects presently being displayed by the display 26. When the serial numbers of the cassette in the cassette reader coincides with the serial numbers of the projects being shown on the display 26 by the master storage 25, the comparator 1206 provides an output to an oscillator 1207. The oscillator 1207 then provides a flasher input to the CRT driver 1201. Thus, the CRT driver 1201 will cause the display of the information corresponding to the cassette in the cassette reader 29 to flash when it is read by the CRT driver 1201.

In addition to identifying the cassette in the cassette reader 29, the preferred embodiment also has a label printer 28 which will print a label for the cassette which will identify the cassette and provide the stored information relating to the cassette, such as the serial number of the cassette, the identification of the individual dictating or the dictate station, the recorder upon which the dictation was recorded, the length of the dictation, and the time the dictation was finished. The label printer 28 is also operative in response to an output from the comparator 1206. As has been described above, an output will be provided by the comparator 1206 when the digital information being read from the master storage 25 by the CRT driver 1201 is the digital information relating to the cassette in the cassette reader 29. Thus, the comparator 1206 enables the label printer 28 to also read the information at that address from the master storage 25 at the same time that the CRT driver 1201 is also reading the information from the master storage 25. As the digital signals carrying information relating to the cassette in the cassette reader pass from the master storage 25, they are accumulated in a buffer 1208. The buffer 1208 temporarily stores the digital information until it can be provided to the label printer 28. The label printer 28 is a printer of conventional design which prints in response to digital signals. The labels provided by the label printer 28 may be backed with adhesive so that they may be easily applied to the cassette.

VI. EXTERNAL ENTRY OF PROJECT INFORMATION

In addition to the input of project information into the master storage 25 from the dictate stations and recorders in the dictation system, the preferred embodiment also has the capability of tracking projects not initiated within the dictation system. The information relating to these projects is input manually through a keyboard into the apparatus where it is processed, and stored in the master storage where it is available for further revision, visual presentation, or printout. The entry of information into the apparatus is initiated by the operation of an external entry key 30d on the keyboard. As is shown in FIG. 6, the operation of the key 30d provides an external entry input to the OR gate 501. The output from the OR gate 501 causes the counter 506 to assign a serial number to the project. This serial number is combined with an "o" unit count and the constant "p" to provide an address for information related to the externally entered project in the master storages 25a. The serial number itself provides an address for the master storages 25b-d. As is shown in FIG. 7, the external entry also provides an input to the OR gate 601. The OR gate 601 provides an enable signal to the master storage 25a enabling it to write the information which is to be input. Inasmuch as the master storage has not been enabled to write by the termination of seizure or substitution of a cassette without loss of seizure by a particular recorder, the ordinary inputs into the master storage from the recorders are not present. Thus, such inputs as the dictation must be entered manually. This information is manually entered through the keyboard 30 by the dictate number input key 30g, the recorder number input key 30n, and the length of project input key 30j, and the length of project input key 30j to the appropriate places in the sequence in the master storage 25a. As has been described above, the master storage 25a has an input from the real time clock 31 and provides the time in for the project when enabled to "write" the data at its inputs into storage. The project information entered through the operation of the external entry key 30d may also be assigned priority or supplemented in the ordinary manner as has been described above in connection with the structure and operation of the master storage 25b, 25c, and 25d as the project is assigned and completed. In this manner, the information provided through the external entry may be tracked in the same manner as information generated from within the dictation system itself, as has been described above.

The external entry information entered in the dictate station identification number location generally should identify the individual from whom the project came. The information entered in the recorder number sequence should generally indicate that the information at that address is information which has been externally entered and not information which relates to dictation recorded on any other recorders. Finally, the length of the project entered externally may be estimated by the operator. This information makes the dictation system including the preferred embodiment of the present invention compatible with and useful for the tracking of a variety of diverse projects unrelated to the operation of the dictation system itself. For example, hand written or typed material which is to be typed or retyped may be entered into a preferred embodiment of the present invention and processed and tracked as if it were a project which had entered through recording by one of the recorders in a dictation system.

VII. DATA PRINTER

In addition to the display of the information in the master storage 25 by the display 26, the information may also be printed on a printer 27. The enable and data inputs to the printer 27 are essentially the same as the inputs to the master storage 25 upon loss of seizure of a recorder, cassette substitution or keyboard entries to supplement project information; however, the printer 27 does not store the information, but causes the information to be printed by a conventional printer capable of printing in response to digital information.

The foregoing has been a description of the structure and operation of alternative illustrative embodiments of the present invention directed toward use in a dictation system. As has been stated at the outset, the present invention is not limited to use in a dictation system, but generally has utility for tracking diverse projects of varying length and complexity in a system in which the projects are not generated simultaneously or completed simultaneously. The foregoing description has been merely illustrative, and the present invention is limited solely by the appended claims.

What is claimed is:

1. A central control system to aid in the supervision and coordination of a plurality of projects which become available to be completed at different times, which originate from a plurality of project originators, and which are to be assigned for completion to a plurality of project terminators, comprising:

an input means selectively operable to provide a plurality of input signals including a plurality of first input signals representative of said plurality of project originators, a plurality of second input signals representative of said plurality of project terminators, a status signal selectively representative of a particular status for some of said plurality of projects, and a plurality of input serial numbers;

clocking means for providing upon each occurrence of one of said plurality of first input signals a first time signal corresponding to the time of said occurrence of said one of said plurality of first input signals and for providing upon each occurrence of one of said plurality of second input signals a second time signal corresponding to the time of said occurrence of said one of said plurality of second input signals;

counting means for providing one of a plurality of assigned serial numbers sequentially upon each occurrence of said one of said plurality of first input signals;

addressing means for providing a plurality of normal addresses each being one of said plurality of assigned serial numbers plus P, P being an integer constant greater than zero;

addressable storage means for storing said one of said plurality of first input signals and the corresponding one of said plurality of said first time signals at one of said plurality of normal addresses upon said each occurrence of said one of said plurality of first input signals, said one of said plurality of normal addresses being P plus the particular one of said plurality assigned serial numbers provided by said counting means upon said occurrence of said one of said plurality of first input signals;

a priority means for sequential provision of one of a plurality of priority addresses, each of said priority addresses being an integer less than P, one of said plurality of priority addresses being provided upon each occurrence of one of said plurality of input serial numbers followed by said status signal from said input means;

relocation means responsive to each occurrence of said provision of one of said plurality of priority addresses from said priority means to store at said priority address of said addressable storage means said first input signal which preceded said status signal and said first time signal stored at the particular one of said normal addresses corresponding to said one of said plurality of input serial numbers; and display means for displaying the contents of said addressable storage means sequentially in order of address.

2. A central control system as recited in claim 1 wherein:

said addressable storage means is responsive to an occurrence of a particular one of said plurality of input serial numbers followed by one of said plurality of second input signals to store said one of said plurality of second input signals and the corresponding second time signal at an address corresponding to said particular input serial number plus P.

* * * * *